(12) United States Patent
Singhal et al.

(10) Patent No.: US 10,146,862 B2
(45) Date of Patent: *Dec. 4, 2018

(54) CONTEXT-BASED METADATA GENERATION AND AUTOMATIC ANNOTATION OF ELECTRONIC MEDIA IN A COMPUTER NETWORK

(71) Applicant: Regents of the University of Minnesota, Minneapolis, MN (US)

(72) Inventors: Ayush Singhal, Minneapolis, MN (US); Ravindra Kasturi, Redmond, WA (US); Jaideep Srivastava, Plymouth, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 532 days.

This patent is subject to a terminal disclaimer.

(21) Appl. No.: 14/817,840

(22) Filed: Aug. 4, 2015

(65) Prior Publication Data

US 2016/0034512 A1 Feb. 4, 2016

Related U.S. Application Data

(60) Provisional application No. 62/032,824, filed on Aug. 4, 2014.

(51) Int. Cl.
*G06F 17/30* (2006.01)

(52) U.S. Cl.
CPC .. *G06F 17/30719* (2013.01); *G06F 17/30705* (2013.01)

(58) Field of Classification Search
None
See application file for complete search history.

(56) References Cited

U.S. PATENT DOCUMENTS

| 8,676,830 B2 | 3/2014 | Mukherjee et al. |
| 2010/0332503 A1 | 12/2010 | Buckley et al. |
| 2016/0034512 A1 | 2/2016 | Singhal et al. |

(Continued)

OTHER PUBLICATIONS

Konkiel., "Tracking Citations and Altmetrics for Research Data: Challenges and Opportunities," Bulletin of the Association for Information Science and Technology, vol. 38, No. 6, Aug./Sep. 2013, 6 pp.

(Continued)

*Primary Examiner* — Amresh Singh
(74) *Attorney, Agent, or Firm* — Shumaker & Sieffert, P.A.

(57) ABSTRACT

Computerized systems for automating content annotation (e.g., tag creation and/or expansion) for low-content items within a computer network by leveraging intelligence of other data sources within a network to generate secondary content (e.g., a "context") for items (e.g., documents) for use in a tagging process. For example, based on user assigned tags for an item, secondary content information can be generated and used to determine a new list of candidate tags for the item. Additionally, the context of an input item may be compared against the respective contexts of a plurality of other items to determine respective levels of similarity between the input item and each of the plurality of other items in order to annotate the input item. Techniques involving web-distance based clustering and leveraging crowd-sourced information sources to remove noisy data from annotated results are also described.

23 Claims, 16 Drawing Sheets

(56) References Cited

U.S. PATENT DOCUMENTS

2016/0034514 A1    2/2016  Singhal et al.

OTHER PUBLICATIONS

"Digital object identifier," Wikipedia, the free Encyclopedia, accessed from https://en.wikipedia.org/w/index.php?title=Digital_object_identifier&oldid=619063164, last modified Jul. 30, 2014, and accessed on Sep. 20, 2017, 7 pp.

Singhai et al., "Data Extract: Mining Context from the Web for Dataset Extraction," International Journal of Machine Learning and Computing, vol. 3, No. 2, Apr. 2013, 2 pp.

Blei et al., "Latent Dirichlet Allocation," Journal of Machine Learning Research, vol. 3, Jan. 2003, pp. 993-1022.

Clifton et al., "TopCat: Data Mining for Topic Identification in a Text Corpus," IEEE Transactions on Knowledge and Data Engineering, vol. 16, No. 8, Aug. 2004, pp. 949-964.

Ertöz et al., "Finding Topics in Collections of Documents: A Shared Nearest Neighbor Approach," Clustering and Information Retrieval, Kluwer Academic Publishers, 2003, pp. 83-103 (Applicant points out, in accordance with MPEP 609.04(a), that the year of publication, 2003, is sufficiently earlier than the effective U.S. filed, Aug. 4, 2014, so that the particular month of publication is not in issue.).

Gabrilovich et al., "Overcoming the Brittleness Bottleneck using Wikipedia: Enhancing Text Categorization with Encyclopedic Knowledge," AAAI, 2006, pp. 1301-1306 (Applicant points out, in accordance with MPEP 609.04(a), that the year of publication, 2006, is sufficiently earlier than the effective U.S. filed, Aug. 4, 2014, so that the particular month of publication is not in issue.).

Hasan et al., "Conundrums in Unsupervised Keyphrase Extraction: Making Sense of the State-of-the-Art,"Coling 2010: Poster Volume, Aug. 2010, pp. 365-373.

Hasan et al., "Automatic Document Topic Identification Using Wikipedia Hierarchical Ontology," The 11th International Conference on Information Sciences, Signal Processing and their Applications: Main Tracks, Jul. 2-5, 2012, pp. 237-242.

Alpert et al., "We knew the web was big . . . ," Google, Official Blog, Jul. 25, 2008, 7 pp.

Ley et al., "Maintaining an Online Bibliographical Database: The Problem of Data Quality," EGC, 2006, 6 pp. (Applicant points out, in accordance with MPEP 609.04(a), that the year of publication, 2006, is sufficiently earlier than the effective U.S. filed, Aug. 4, 2014, so that the particular month of publication is not in issue.).

Mihalcea et al., "TextRank: Brining Order into Texts," Conference on Empirical Methods in Natural Language Processing, 2004, 8 pp. (Applicant points out, in accordance with MPEP 609.04(a), that the year of publication, 2004, is sufficiently earlier than the effective U.S. filed, Aug. 4, 2014, so that the particular month of publication is not in issue.).

Moura et al., "Choosing a Hierarchical Cluster Labelling Method for a Specific Domain Document Collection," New Trends in Artificial Intelligence, 2007, 12 pp. (Applicant points out, in accordance with MPEP 609.04(a), that the year of publication, 2007, is sufficiently earlier than the effective U.S. filed, Aug. 4, 2014, so that the particular month of publication is not in issue.).

Sebastiani, "Machine Learning in Automated Text Categorization," ACM Computing Surveys (CSUR), vol. 34, No. 1, Mar. 2002, pp. 1-47.

Turney, "Learning Algorithms for Keyphrase Extraction," Information Retrieval, vol. 2, Oct. 12, 1999, pp. 303-336.

Witten et al., "KEA: Practical Automatic Keyphrase Extraction," The 4th ACM Conference on Digital Libraries, Aug. 11-14, 1999, pp. 254-255.

Wu et al., "Interpreting TF-IDF Term Weights as Making Relevance Decisions," ACM Transactions on Information Systems (TOIS), vol. 26, No. 3, Article 13, Jun. 2008, 41 pp.

Balabanovic et al., "Fab: Content-Based, Collaborative Recommendation," Communications of the ACM, vol. 40, No. 3, Mar. 1997, pp. 66-72.

Cilibrasi et al., "The Google Similarity Distance," IEEE Transactions on Knowledge and Data Engineering, vol. 19, No. 3, Mar. 2007, pp. 370-383.

Di Noia et al., "Exploiting the Web of Data in Model-based Recommender Systems," RecSys '12, Sep. 9-13, 2012, 4 pp.

Gantner et al., "Factorization Models for Context-/Time-Aware Movie Recommendations," CAMRa2010, Sep. 30, 2010, 6 pp.

Guy et al., "Personalized Recommendation of Social Software Items Based on Social Relations," RecSys'09, ACM, Oct. 23-25, 2009 pp. 53-60.

He et al., "Position-Aligned Translation Model for Citation Recommendation," String Processing and Information Retrieval, 19th International Symposium, SPIRE 2012, Oct. 2012, pp. 251-263.

He et al., "Citation Recommendation without Author Supervision," WSDM'11, ACM, Feb. 9-12, 2011, pp. 755-764.

He et al., "Context-aware Citation Recommendation," WWW 2010, ACM, Apr. 26-30, 2010, pp. 421-430.

Herlocker et al., "Evaluating Collaborative Filtering Recommender Systems," ACM Transactions on Information Systems, vol. 22, No. 1, Jan. 2004, pp. 5-53.

Li et al., "A Contextual-Bandit Approach to Personalized News Article Recommendation," WWW 2010, ACM, Apr. 26-30, 2010, pp. 661-670.

Liu et al., "Incorporating Social Networks and User Opinions for Collaborative Recommendation: Local Trust Network based Method," CAMRa 2010, ACM, Sep. 30, 2010, pp. 53-56.

Maneewongvatahna et al., "A Recommendation Model for Personalized Book Lists," 2010 International Symposium on Communications and Information Technologies (ISCIT), IEEE, Oct. 26-29, 2010, pp. 389-394.

Nascimento et al., "A Source Independent Framework for Research Paper Recommendation," JCDL'11, Jun. 13-17, 2011, 10 pp.

Nitzan et al., "A further characterization of Borda ranking method," Public Choice, vol. 36, No. 1, Jan. 1981, pp. 153-158.

Su et al., "Music Recommendation Using Content and Context Information Mining," IEEE Intelligent Systems, Jan./Feb. 2010, pp. 16-26.

Wetzker et al., "A hybrid approach to item recommendation in folksonomies," ESAIR '09, ACM, Feb. 9, 2009, 5 pp.

Winoto et al., "Contexts in a Paper Recommendation System with Collaborative Filtering," The International Review of Research in Open and Distance Learning, vol. 13, No. 5, Dec. 2012, pp. 56-75.

Yao et al., "Product Recommendation Based on Search Keywords," 2012 9th Web Information Syszems and Applications Conference, IEEE, Nov. 16-18, 2012, pp. 67-70.

Campbell et al., "IBM Research TRECVID-2007 Video Retrieval System," TRECVID, 2007, 15 pp. (Applicant points out, in accordance with MPEP 609.04(a), that the year of publication, 2007, is sufficiently earlier than the effective U.S. filing date, August 4, 2014, so that the particular month of publication is not in issue.).

Cramer et al., "Chapter 18: Exploring Resources for Lexical Chaining. A Comparison of Automated Semantic Relatedness Measures and Human Judgments," Modeling, Learning, and Processing of Text-Technological Data Structures, Springer, 2011, pp. 377-396 (Applicant points out, in accordance with MPEP 609.04(a), that the year of publication, 2011, is sufficiently earlier than the effective U.S. filed, Aug. 4, 2014, so that the particular month of publication is not in issue.).

Gilbert et al., "A Picture is Worth a Thousand Tags: Automatic Web Based Image Tag Expansion," Computer Vision—ACCV 2012, Lecture Notes in Computer Science, vol. 7725, 2013, 14 pp. (Applicant points out, in accordance with MPEP 609.04(a), that the year of publication, 2013, is sufficiently earlier than the effective U.S. filed, Aug. 4, 2014, so that the particular month of publication is not in issue.).

Guillaumin et al., "TagProp: Discriminative Metric Learning in Nearest Neighbor Models for Image Auto-Annotation," 2009 IEEE 12th International Conference on Computer Vision (ICCV), Sep. 27-Oct. 4, 2009, pp. 309-316.

Hertz et al., "Learning Distance Functions for Image Retrieval," Proceedings of the 2004 IEEE Computer Society Conference on Computer Vision and Pattern Recognition (CVPR'04), Jun. 27-Jul. 2, 2004, 8 pp.

(56) References Cited

OTHER PUBLICATIONS

Heymann et al., "Can Social bookmarking Improve Web Search?," WSDM'08, ACM, Feb. 11-12, 2008, pp. 195-205.
Li et al., "User-Related Tag Expansion for Web Document Clustering," Advances in Information Retrieval, 33$^{rd}$ European Conference on IR Research, ECIR 2011, Apr. 18-21, 2011, pp. 19-31.
Li et al., "Learning Social Tag Relevance by Neighbor Voting," IEEE Transactions on Multimedia, vol. 11, No. 7, Nov. 2009, pp. 1310-1322.
Lin, "Projected Gradient Methods for Nonnegative Matrix Factorization," Neural Computation, vol. 19, No. 10, Oct. 2007, pp. 2756-2779.
Liu et al., "Annotating Flickr Photos by Manifold-Ranking Based Tag Ranking and Tag Expanding," First International Conference, ICICA 2010, LNCS 6377, Oct. 15-18, 2010, pp. 221-228.
Mørup, "Parallel Factor Analysis as an exploratory tool for wavelet transformed event-related EEG," NeuroImage, vol. 29, Sep. 26, 2005, pp. 938-947.
Nielsen et al., Mining for Associations Between Text and Brain Activation in a Functional Neuroimaging Database, Neuroinformatics, vol. 2, No. 4, 2004, pp. 369-379 (Applicant points out, in accordance with MPEP 609.04(a), that the year of publication, 2004, is sufficiently earlier than the effective U.S. filed, Aug. 4, 2014, so that the particular month of publication is not in issue.).
Qi et al., "Correlative Multi-Label Video Annotation," MM'07, Sep. 23-28, 2007, 10 pp.
Ramage et al., "Clustering the Tagged Web," In Proceedings of the Second ACM International Conference on Web Search and Data Mining, ACM, 2009, pp. 54-63 (Applicant points out, in accordance with MPEP 609.04(a), that the year of publication, 2009, is sufficiently earlier than the effective U.S. filed, Aug. 4, 2014, so that the particular month of publication is not in issue.).
Lee et al., "Algorithms for Non-negative Matrix Factorization," Advances in Neural Information Processing Systems 13, Proceedings of the 2000 Conference, 2001, pp. 556-562 (Applicant points out, in accordance with MPEP 609.04(a), that the year of publication, 2001, is sufficiently earlier than the effective U.S. filed, Aug. 4, 2014, so that the particular month of publication is not in issue.).
Gul Sevil et al., "Automatic tag expansion using visual similarity for photo sharing websites," Multimedia Tools and Applications, vol. 49, Oct. 14, 2009, pp. 81-99.
Sigurbjörnsson et al., "Flickr Tag Recommendation based on Collective Knowledge," WWW 2008 / Refereed Track: Rich Media, Apr. 21-25, 2008, pp. 327-336.
Tang et al., "Video Annotation Based on Kernel Linear Neighborhood Propagation," IEEE Transactions on Multimedia, vol. 10, No. 4, Jun. 2008, pp. 620-628.
Wu et al., "Multi-label Boosting for Image Annotation by Structural Grouping Sparsity," MM'10, Oct. 25-29, 2010, 10 pp.
Wu et al., "Distance Metric Learning from Uncertain Side Information with Application to Automated Photo Tagging," MM'09, Oct. 19-24, 2009, 10 pp.
Yakhnenko et al., "Annotating images and image objects using a hierarchical Dirichlet process model," MDM/KDD 2008, Aug. 24, 2008, 7 pp.
Yang et al., "Mining multi-tau association for image tagging," World Wide Web, vol. 14, No. 2, Springer, Dec. 22, 2010, pp. 133-156.
Zhang et al., "Automatic Image Annotation Using Group Sparsity," 2010 IEEE Conference on Computer Vision and Pattern Recognition (CVPR), Jun. 13-18, 2010, 8 pp.
Zhiqiang et al., "Measuring Semantic Similarity between Words Using Wikipedia," 2009 International Conference on Web Information Systems and Mining, Nov. 7-8, 2009, pp. 251-255.
Asadi et al., "Shifts in search engine development: A review of past, present and future trends in research on search engines," Webology, vol. 1, No. 2, Dec. 2004, 13 pp.
Cavnar, "Using An N-Gram-Based Document Representation With a Vector Processing Retrieval Model," Conference Paper, DBLP, Jan. 1994, 10 pp.

Emtage et al., "archie: An Electronic Directory Service for the Internet," Proceedings of the Winter 1992 USENIX Conference, Jan. 20-24, 1992, 20 pp.
Gordon et al., "Finding information on the World Wide Web: the retrieval effectiveness of search engines," Information Processing & Management, vol. 35, No. 2, Mar. 1999, pp. 141-180.
He et al., "Context-aware Citation Recommendation." WWW 2010, Apr. 26-30, 2010, pp. 421-430.
Kraaij et al., "Viewing Stemming as Recall Enhancement," Proceedings of the 19$^{th}$ Annual International ACM SIGIR Conference on Research and Development in Information Retrieval, Aug. 18-22, 1996, pp. 40-48.
Martins et al., "Spelling Correction for Search Engine Queries," Advances in Natural Language Processing, 4$^{th}$ International Conference, EsTAL 2004, Oct. 20-22, 2004, pp. 372-383.
Mukherjea et al., "Towards a multimedia World-Wide Web information retrieval engine," Computer Networks and ISDN Systems, vol. 29, No. 8, Sep. 1997, pp. 1181-1191.
Rose et al., "Understanding User Goals in Web Search," Proceedings of the 13th International Conference on World Wide Web, May 17-22, 2004, pp. 13-19.
Siersdorfer et al., "Automatic Video Tagging using Content Redundancy," Proceedings of 32$^{nd}$ Annual International ACM SIGIR Conference on Research and Development in Information Retrieval, Jul. 19-23, 2009, pp. 395-403.
Singhal et al., "Leveraging Web Intelligence for Finding Interesting Research Datasets," 2013 IEEE/WIC/ACM International Conferences on Web Intelligence (WI) and Intelligent Agent Technology (IAT), IEEE, vol. 1, Nov. 17-20, 2013, pp. 321-328.
Singhal et al., "Data Extract: Mining Context from the Web for Dataset Extraction," International Journal of Machine Learning and Computing, vol. 3, No. 2, Apr. 2013, pp. 219-223.
Sparck Jones et al., "A probabilistic model of information retrieval: development and comparative experiments, Part 1," Information Processing & Management, vol. 36, No. 6, Nov. 2000, pp. 779-808.
Tran et al., "Ontology-Based Interpretation of Keywords for Semantic Search," The Semantic Web. 6$^{th}$ International Semantic Web Conference, 2$^{nd}$ Asian Semantic Web Conference, ISWC 2007 + ASWC 2007, Nov. 11-15, 2007, 16 pp.
Venditto, "Search Engine Showdown," Internet World, May 1996, 11 pp.
Wu et al., "Multi-label Boosting for Image Annotation by Structural Grouping Sparsity," MM'10, ACM, Oct. 25-29, 2010, pp. 15-24.
Anklesaria et al., "The Internet Gopher Protocol (a distributed document search and retrieval protocol)," Network Working Group, RFC 1436, Mar. 1993, 16 pp.
Lu et al., "A Dataset Search Engine for the Research Document Corpus," 2012 IEEE 28th International Conference on Data Engineering, Apr. 1-5, 2012, pp. 1237-1240.
Skomoroch, "Some Datasets Available on the Web," retrieved from https://web.archive.org/web/20150829030715/http://www.datawrangling.com/some-datasets-available-on-the-web, Jan. 17, 2008, 14 pp.
Guy et al., "Social Media Recommendation based on People and Tags," SIGIR'10, Jul. 19-23, 2010, pp. 194-201.
Basu et al., "Technical Paper Recommendation: A Study in Combining Multiple Information Sources," Journal of Artificial Intelligence Research 1, arXiv preprint arXiv:1106.0248, May 2001, pp. 231-252.
Middleton et al., "Ontology-Based Recommender Systems," Handbook on Ontologies, International Handbooks on Information Systems, Springer, 2009, pp. 779-796 (Applicant points out, in accordance with MPEP 609.04(a)) that the year of publication, 2009, is sufficiently earlier than the effective U.S. filing date, Aug. 4, 2014, so that the particular month of publication is not in issue.).
Dumais, "Latent Semantic Indexing (LSI): TREC-3 Report," Overview of the Third Text Retrieval Conference, 1995, 12 pp. (Applicant points out, in accordance with MPEP 609.04(a), that the year of publication, 1995, is sufficiently earlier than the effective U.S. filing date, Aug. 4, 2014, so that the particular month of nublication is not in issue.).
Lops et al., "Chapter 3: Content-based Recommender Systems: State of the Art and Trends," Recommender Systems Handbook,

(56) References Cited

OTHER PUBLICATIONS

Springer, 2011, pp. 73-105 (Applicant points out, in accordance with MPEP 609.04(a), that the year of publication, 2011, is sufficiently earlier than the effective U.S. filed, Aug. 4, 2014, so that the particular month of publication is not in issue.).

Lipczak et al., "Tag Recommendation for Folksonomies Oriented towards Individual Users," ECML PKDD Discovery Challenge 2008, Sep. 2008, 12 pp.

Lipczak et al., "Tag Sources for Recommendation in Collaborative Tagging Systems," ECML PKDD Discovery Challenge 2009, Sep. 7-11, 2009, 16 pp.

CONTEXT-BASED METADATA GENERATION AND AUTOMATIC ANNOTATION OF ELECTRONIC MEDIA IN A COMPUTER NETWORK

This application claims the benefit of U.S. Provisional Patent Application No. 62/032,824, filed Aug. 4, 2014, the entire contents of which are incorporated herein by reference.

STATEMENT REGARDING FEDERALLY SPONSORED RESEARCH OR DEVELOPMENT

This invention was made with government support under W911NF-09-2-0053 and W911NF-12-C-0028 awarded by Army Research Laboratory and DARPA. The government has certain rights in the invention.

BACKGROUND

The retrieval of items over a computer network, such as the "web," depends heavily on text content of the items. Often the items require additional content (e.g., metadata) or description for efficient retrieval, categorization, and/or information management. "Tagging," or assigning keywords, is one of the most popular approaches for creating useful content or semantic descriptions for such items. For example, tagging text documents may be used for categorization (e.g., clustering) of documents for information management. Similarly, tagging multimedia items such as images, songs, and videos using online tools has led to the development of specialized search engines that are able to search non-text items using text input.

Images, videos, songs and similar multimedia items are common items which are tagged either manually or in a semi-automatic manner. In general the content structure of such items is easy to interpret and hence the tagging process is simplified. However, the tagging process becomes more complicated when an item has little suitable content. Such a problem affects items like scientific research datasets that have little descriptive text content, documents with very little text content, or other items. Furthermore, several items' content might be protected and not accessible for summarization. For example, in several cases the full content of a research paper or other document may not be publically available to users. Additionally, available content for an item, such as the title of a document, may not convey the essence of the content in the item. While manual tagging of items by experts is desirable, it is not a feasible solution on a large scale.

SUMMARY

Techniques are described for generalized approaches to automate content annotation (e.g., tag creation and/or expansion) for low-content items within a computer network. The techniques leverage intelligence of other data sources within the network to generate secondary content (e.g., a "context") for such items for use in the tagging process.

In one example, a system configured in accordance with the techniques described herein is operable to generate expanded tags for an item. Given an item along with user assigned tags for the item, the system may generate secondary content information for the item using the initial user provided tags. The system may use this generated context to determine a list of new candidate tags for the item. In some examples, the system may use web-distance based clustering techniques to remove noisy tags from the list of candidate tags.

In one example, a system configured in accordance with the techniques described herein is operable to annotate items with tags, such as words or phrases, that are close to human-generated annotations. The system may generate a context for the item and compare the generated context to a database of topics to determine tags for the item. In some examples, the system may create and/or maintain the topic database using open source knowledge bases like WikiCFP™ and Wikipedia™. Generation of topics from open sources may provide additional capabilities regarding abstract topics and may ensure topics are up-to-date with terminologies in current trends. Additionally, the system may perform techniques to identify relevant summary words for items, such as research documents without using much content information from the document (e.g., just the title of the paper). For this purpose, the intelligence of academic search engines like Google scholar are used to construct a context for a given document title. The summary words may be identified by matching the global context of the document with the context of the Wikipedia-based topics.

In one example, a method includes generating, by a computing device and based at least in part on information about an input item, a context of the input item, comparing, by the computing device, the context of the input item to respective contexts of a plurality of other items to determine respective levels of similarity between the input item and each of the plurality of other items, and annotating the input item with information derived from at least one of the plurality of other items based at least in part on the respective levels of similarity between the input item and each of the plurality of other items.

In one example, a method includes generating, by a computing device and based at least in part on a user assigned tag for an input item, secondary content information for the input item, generating, by the computing device and based at least in part on the secondary content information, a list of candidate new tags for the input item, and removing, by the computing device, noisy tags from the list of candidate new tags by using a web-distance based clustering technique.

In one example, a method includes generating, by a computing device, a topic corpus for use in annotating input items, the topic corpus comprising at least one topic, constructing, by the computing device a global context for each topic in the topic corpus, and ranking, by the computing device, each topic in the topic corpus by comparing the global context for the topic to a global context for the input item.

In some examples, techniques of the present disclosure also address the problem of topic drift by automating removal of the noisy tags from the set of candidate new tags.

DETAILED DESCRIPTION

Techniques of the present disclosure enable a computing system or other computing device to annotate items with descriptive metadata by leveraging various information sources within a computer network, such as the Internet, to automatically and dynamically generate topics and, for those topics, a broader collection of data that accurately and descriptively provides context for each of the topics (i.e., a descriptive context for each of the topics). A context for an individual input item, such as a document, video or other item, may then be generated by similarly leveraging the external data sources and compared, using the generated context, to the context for the topics to identify and determine relevant and/or useful descriptive content (e.g., metadata) with which to annotate the item.

By broadening the descriptive data describing an individual item, the techniques described herein allow for automated annotation of documents or other items that by themselves include little descriptive content. That is, by generating and using contexts for items, more accurate annotation can be achieved despite limited understanding of the structure and/or subject matter of the items. For instance, a system configured in accordance with the techniques described herein may annotate or "tag" items such as text documents (e.g., research papers, news articles, books, etc.), images, audio files (e.g., music, podcasts, etc.), video (e.g., movies, TV shows, etc.), research datasets, or other items. The system may create or add metadata to items stored within public information databases and academic resources such as research papers, books, journal articles, or other items. Such techniques improve automated annotation systems and thus improve quality of results when using search engines based on such metadata, such as image search engines. Furthermore, by generating metadata for items having little descriptive content, the techniques described herein may bring a multitude of new items within the realm of search algorithms.

Figure 1:
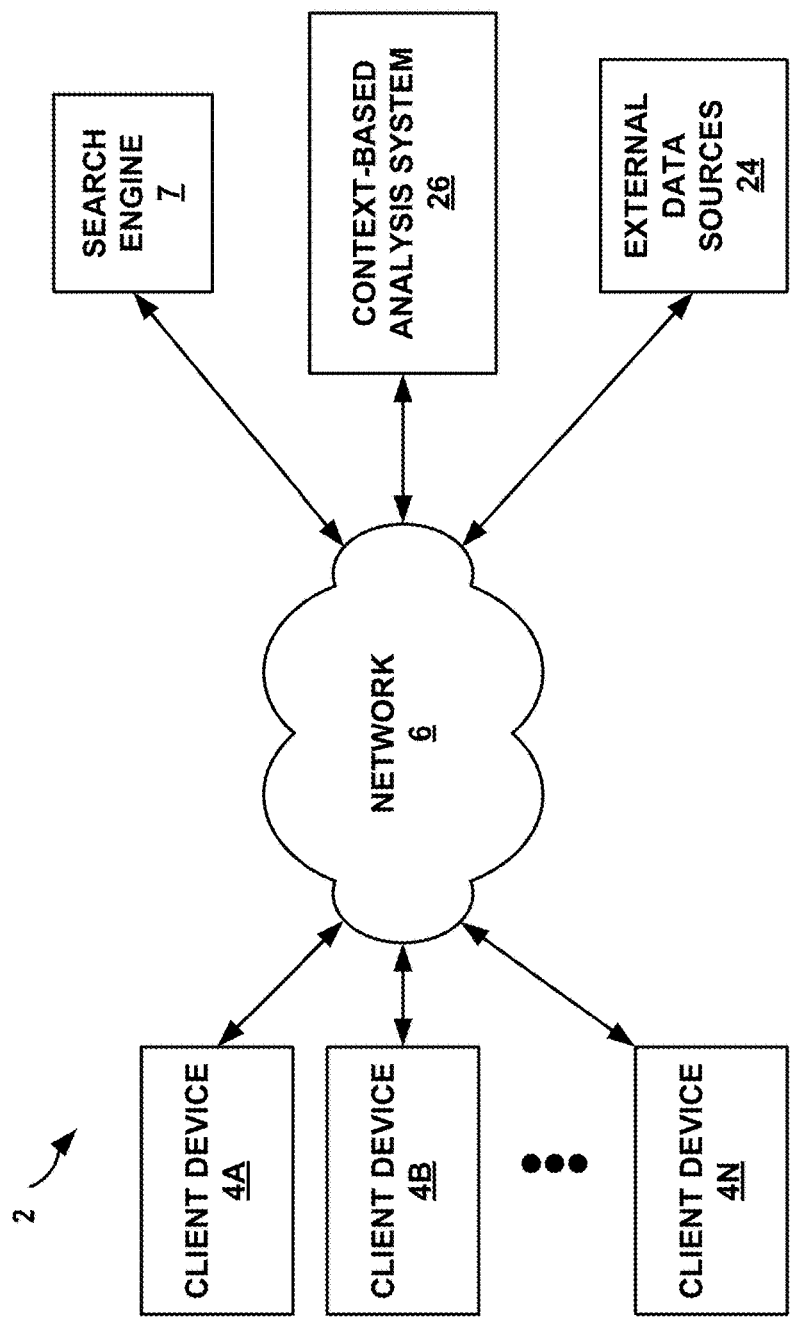
FIG. 1 is a block diagram illustrating an example computing environment in which a context-based analysis system may be configured to annotate input items, in accordance with one or more aspects of the present disclosure.

FIG. 1 is a block diagram illustrating an example computing environment in which a context-based analysis system 26 may be configured to annotate input items, in accordance with one or more aspects of the present disclosure. In the example of FIG. 1, computing environment 2 may include client devices 4A-4N (collectively, "client devices 4"), network 6, and context-based analysis system 26. Client devices 4 may each be a computing device. Examples of computing devices may include, but are not limited to, portable, mobile, or other devices such as mobile phones (including smartphones), laptop computers, desktop computers, tablet computers, smart television platforms, personal digital assistants (PDA's), server computers, mainframes, and the like. For instance, in the example of FIG. 1, client device 4A may be a tablet computer, client device 4B may be a laptop computer and client device 4N may be a smartphone. In various instances, client devices 4 may include various components for performing one or more functions such as output devices, input devices, network interface devices, and the like. For example, client devices 4 may include network interface devices for communicating with one or more networks, such as network 6.

Network 6 may represent any communication network, such as a packet-based digital network. In some examples, network 6 may represent any wired or wireless network such as the Internet, a private corporate intranet, or a public switched telephone network (PSTN). Network 6 may include both wired and wireless networks as well as both public and private networks. Context-based analysis system 26 may contain one or more network interface devices for communicating with other devices, such as client devices 4, via network 6. For example, client device 4A may transmit a request to view video content via a wireless card to a publicly accessible wide area wireless network (which may comprise one example of network 6). The wide area network may route the request to one or more components of context-based analysis system 26, via a wired connection (in this particular non-limiting example).

Context-based analysis system 26 may receive the request sent by client device 4A via network 6. Context-based analysis system 26 may, in some examples, be a collection of one or more hardware devices, such as computing devices. In other examples, context-based analysis system 26 may comprise firmware and/or one or more software applications (e.g., program code) executable by one or more processors of a computing device or a group of computing devices. In yet another example, context-based analysis system 26 may be a combination of hardware, software, and/or firmware. In some examples, one or more components of context-based analysis system 26 may perform more or other functions than those described in the present disclosure. While shown in FIG. 1 as a unitary system, context-based analysis system 26 may include various units distributed over and communicatively connected via one or more networks (e.g., network 6).

As described in further detail below, context-based analysis system 26 dynamically generates one or more content databases having descriptive content. In some examples, the content database may be separate and distinct from other components of context-based analysis system 26. In other examples, the content database may be included in one or more other components of context-based analysis system 26. In some instances, the content database may include information from one or more external data sources 24 (e.g., data systems associated with journals, industry-standard setting organizations, conferences, research institutions, Universities, etc.).

In the example of FIG. 1, context-based analysis system 26 may communicate with search engine 7 via network 6. While shown as separate from context-based analysis system 26 in the example of FIG. 1, search engine 7 may be part of context-based analysis system 26. That is, in some examples, search engine 7 may be external to context-based analysis system 26 (e.g., one or more external data sources) and connected to context-based analysis system 26 in other ways, such as via network 6. Search engine 7 may include hardware, firmware, software, or any combination thereof capable of receiving search queries, performing searches, and/or returning results. In some examples, search engine 7 may search one or more databases associated with external data sources 24, such as corporate databases, knowledge bases, or other information repositories. Such databases or information repositories may be included in search engine 7 or separate and apart from search engine 7, in various examples. In other examples, search engine 7 may perform searches of one or more networks, such as the Internet. For instance, search engine 7 may be a corporate search engine capable of performing searches based on one or more structured queries using a query language (e.g., Structured Query Language), a search algorithm built for a specific database, or a commercial search engine capable of crawling, indexing, and searching web content.

In some examples, context-based analysis system 26 may generate the context based at least in part on information about the input item, such as a title, previously-annotated metadata or tags, or other information.

Furthermore, by automatically and dynamically generating additional context for input items, in some examples, context-based analysis system 26 may enable accurate metadata tagging of input items even when each individual item contains only limited contextual information, such as research data that is sparse with descriptive text, videos having little descriptive textual information and the like. That is, the techniques described herein leverage other external data sources 24 so as to allow for annotation or tagging of items with new or additional metadata, thereby allowing users and/or search engines to more easily search for relevant content.

Figure 2:
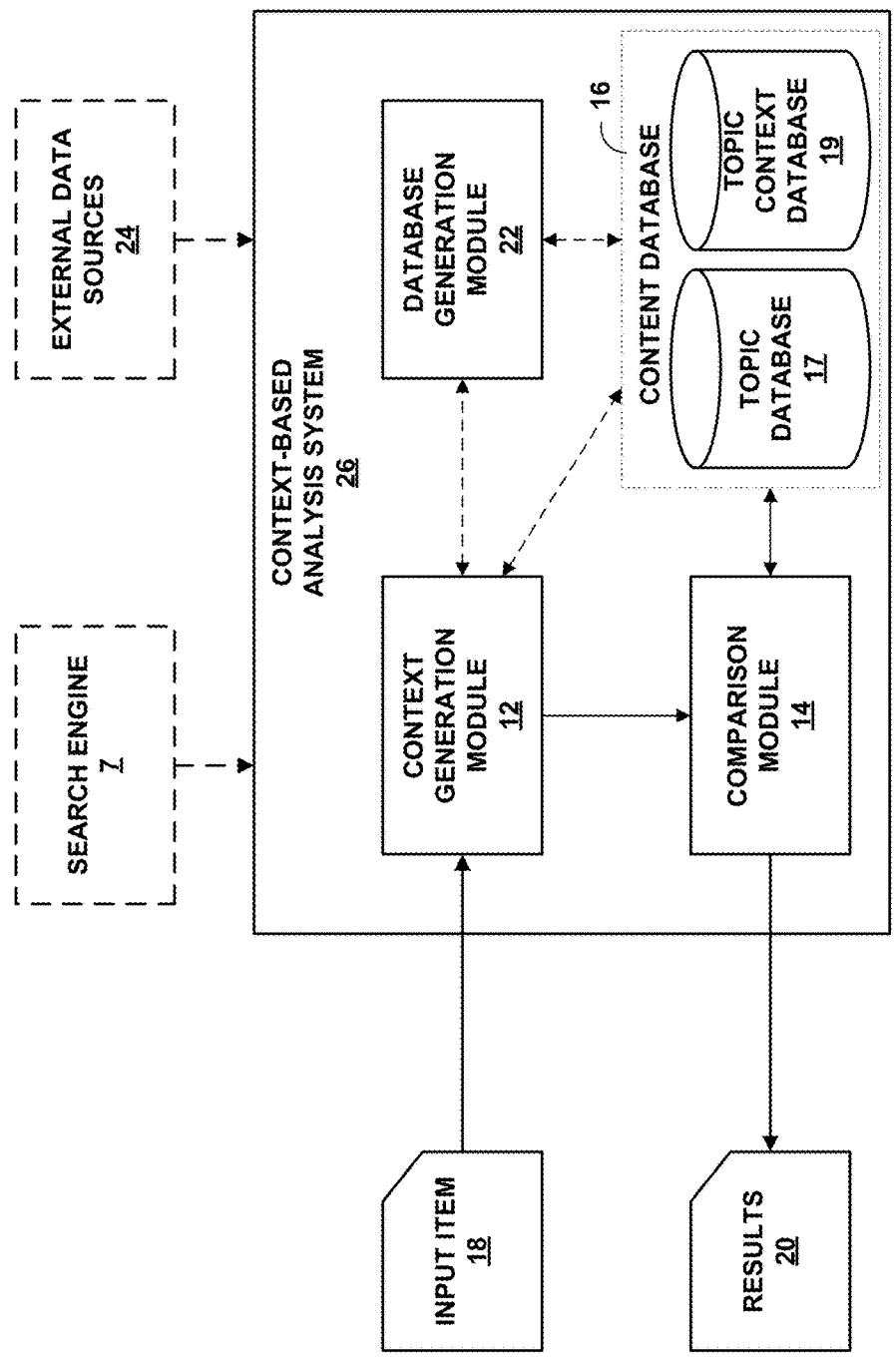
FIG. 2 is a block diagram illustrating in more detail an example context-based analysis system in accordance with one or more techniques of the present disclosure.

FIG. 2 is a block diagram illustrating an example context-based analysis system 26 ("system 26") in accordance with one or more techniques of the present disclosure. In the example of FIG. 2, system 26 may represent a computing device or computing system, such as a mobile computing device (e.g., a smartphone, a tablet computer, and the like), a desktop computing device, a server system, a distributed computing system (e.g., a "cloud" computing system), or any other device capable of performing the techniques described herein.

As shown in the example of FIG. 2, system 26 includes context generation module 12, comparison module 14, and content database 16. In some examples, system 26 may also include database generation module 22. Each of modules 12, 14, and 22 may be hardware, firmware, software, or some combination thereof. Content database 16 may, in the example of FIG. 2, represent a data repository or other collection of information that is accessible and/or modifiable by one or more of modules 12, 14, and 22. For example, content database 16 may be comprised of a topic database 17 or a topic context database 19 which is accessible and/or modifiable by one or more of modules 12, 14, and 22.

Context generation module 12, in the example of FIG. 2, may be operable to receive an item (e.g., input item 18), or an identifier for an input item such as a universal resource locator (URL), and generate additional descriptive context for the item. An item, in general, may be a file, an object, a data structure, or any other collection of information. Examples of items include text documents (e.g., research papers, dissertations, white papers, journal articles, books, magazines, news articles, and the like), multimedia files (e.g., images, audio files, video files, movies, TV shows, songs, audiobooks, and other media), collections of data (e.g., databases, research datasets, lists, multidimensional datasets, and the like). In other words, an item may be any arrangement of information.

Context generation module 12 generates the context for input item 18 based at least in part on information about the item. As one example, if input item 18 is a text document, such as a research paper, context generation module 12 may generate a context for the item based on a title of the research paper. Additionally or alternatively, context generation module 12 may generate the context based on an author of the item, on a portion of the item's content (e.g., an abstract or summary), on the entire content of the item, or on any other information. As another example, input item 18 may previously be annotated with metadata (e.g., tags). In such instance, context generation module 12 may generate the context for input item 18 based at least in part on the previous annotations. That is, in various examples, context generation module 12 uses various different types of available information about input item 18 to generate a context for input item 18.

In some examples, context generation module 12 may generate the context for an item by performing a query for the information about the item. For example, a context may be generated for a research paper by searching a database of academic materials (e.g., using Google Scholar™) using a title of the research paper. Context generation module 12 may add the titles of the top-k results of the search to the context being assembled for the research paper.

In some examples, one or more modules of system 26 may create and/or maintain content database 16. For instance, database generation module 22 may use data from external data sources 24 to create and/or maintain a database of topics while context generation module 12 may only perform the functions of generating a topic context and a title context, in accordance with one or more techniques of the present disclosure. However, aspects of this disclosure are not so limited. For example, database generation module 22 may perform the functions associated with context generation module 12 and likewise, the functions associated with comparison module 14, or any combination thereof.

As discussed in various examples herein, techniques of the present disclosure enable system 26 to annotate items with descriptive metadata by leveraging external data sources 24 within network 6 to automatically and dynamically generate topic database 17 and, for topics comprising topic database 17, topic context database 19. As such, topic context database 19 comprises a broader collection of data that accurately and descriptively provides context for those topics comprising topic database 17 (i.e., a descriptive context for each of the topics). Context generation module 12 may then generate a context for an individual input item 18 (e.g., a document, video or other item) by similarly leveraging external data sources 24. Comparison module 14 then compares the generated context of input item 18 to the broader collection of data comprising topic context database 19 to identify and determine relevant and/or useful descriptive content (e.g., metadata) with which to annotate the item (e.g., results 20).

Figure 3:
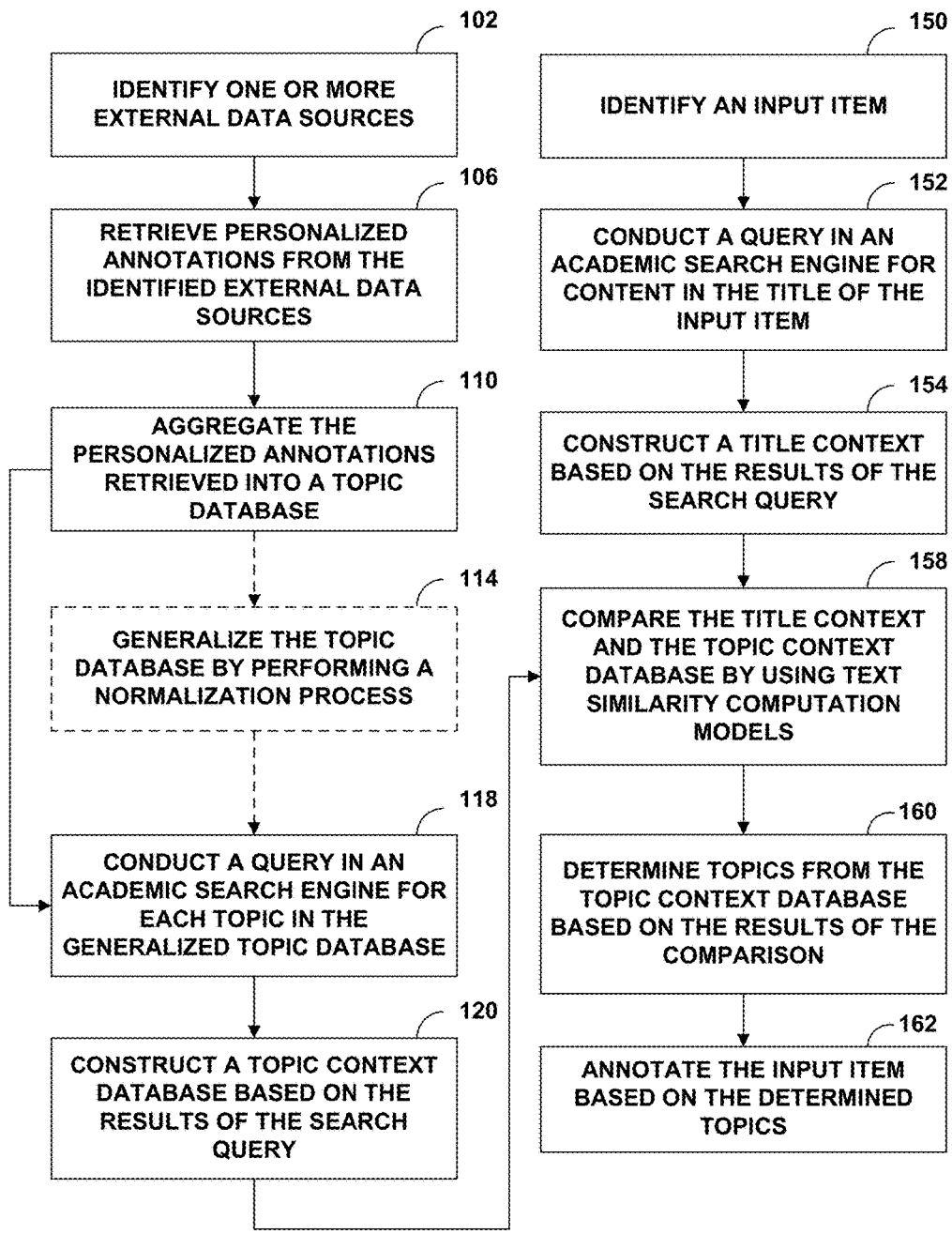
FIG. 3 is a flow diagram illustrating an example operation for determining one or more topics based at least on the generation of a topic context database and a construction of a title context.

FIG. 3 is a flow diagram illustrating example operations for creating a topic context database 19 and for creating a global context for a plurality of topics such that the task of topic generation may be automated in accordance with one or more techniques of the present disclosure. For purposes of illustration only, the example operations of FIG. 3 are described below in reference to context-based analysis system 26 of FIGS. 1-2.

In the example of FIG. 3, database generation module 22 (FIG. 2) identifies one or more external data sources 24 (e.g., various research venues, Call for Papers database) (102), and retrieves a plurality of personalized annotations (e.g., human-created labels, topics) from the one or more identified external data sources (106). For example, database generation module 22 may identify, as external data sources, one or more research venues (e.g., journals, conferences, etc.). In some instances, a Call for Papers (CFP) database (e.g., WikiCFP) may provide a feature for obtaining CFPs for one or more research venues. In one example, database generation module 22 may search WikiCFP to obtain such information. Database generation module 22 then aggregates the plurality of personalized annotations retrieved into a topic database 17 (110). In other words, topic database 17 should be comprised of topics retrieved from the one or more research venues corresponding to the plurality of personalized annotations.

In other examples, as shown in FIG. 3, topic database 17 may contain noise (e.g., repetition of research topics, irrelevant topics, highly specialized topics, etc.). As an example, "mining of web data" and "web based mining" may refer to the same topic of "web mining." The introduction of noise may be a result of personalized annotations being assigned differently by different individuals. In order to remove such noise from the database, database generation module 22 may perform a normalization process (e.g., refinement) on the topic database 17 to reduce any potential noise (114). Further details are discussed below with respect to FIG. 4 describing an example process by which database generation module 22 may remove noise from topic database 17 using a crowd-sourced information source.

In the next instance, as shown in FIG. 3, context generation module 12 conducts a query in an academic search engine (e.g., Google Scholar) for each topic in the topic database 17 (118). Based at least in part on the results of the search query, context generation module 12 then constructs and/or maintains a topic context database 19 for each topic in the topic database 17 (120). In some examples, context generation module 12 may store all results of the search, while in other examples, context generation module 12 may store only the most relevant results (e.g., the top result, the top five results, or other number of results).

Meanwhile, system 26 receives input item 18 or information relating to input item 18 (e.g., a URL) (150). Based on this information, context generation module 12 then constructs a title context for input item 18. In the example of FIG. 3, context generation module 12 conducts a query in an academic search engine (e.g., Google Scholar) using the title of an input item 18 (152). Context generation module 12 may then construct a title context for the input item 18 based at least in part on the results of the search query (154). In some examples, context generation module 12 may store all results of the search, while in other examples, context generation module 12 may store only the most relevant results (e.g., the top result, the top five results, or other number of results).

Once context generation module 12 constructs a title context for input item 18, comparison module 14 then compares the context of input item 18 with the context for each item stored in topic context database 19. In order to conduct this comparison, comparison module 14 first generates a vector for the contexts, and determines the cosine similarity measure between the contexts. As such, each vector represents the semantic makeup of the respective context. That is, comparison module 14 generates a vector for the context of input item 18 that reflects how important each word in a document (e.g., the context) is within a corpus of documents (e.g., all the contexts). FIG. 3 describes one example method for comparing contexts.

In the example of FIG. 3, comparison module 14 may compare the title context to respective items in topic context database 19 to determine respective levels of similarity between the title context and topic context database (158). In order to compute the similarity, comparison module 14 may use, for example, text similarity computation models, such as TF-IDF, a LDA-TFIDF model or a LSI-TFIDF model. For instance, topic context database 19 may generate a vector that represents the semantic makeup of each context and determine the cosine similarity between vectors.

In some examples, such as where the other items are topics, system 26 may annotate the input item with the other items that have a context that is most similar to the context of the input item. Based on the respective cosine similarity values for respective contexts of the items, comparison module 14 may select a number of the items from content database 16 as tags with which to annotate input item 18. For instance, comparison module 14 may select the items that correspond to the top ten cosine similarities. As another example, comparison module 14 may select, as tags, the items of content database 16 that correspond to cosine similarity values over a certain threshold. In the example of FIG. 3, comparison module 14 ranks the contexts of the other items in content database 16 based on their respective cosine similarity values. Finally, comparison module 14 may determine one or more topics with which to annotate input item 18 based at least in part on the similarity computation used (160) and allow for automatic annotation of input item 18 using the determined topics (162).

Figure 4:
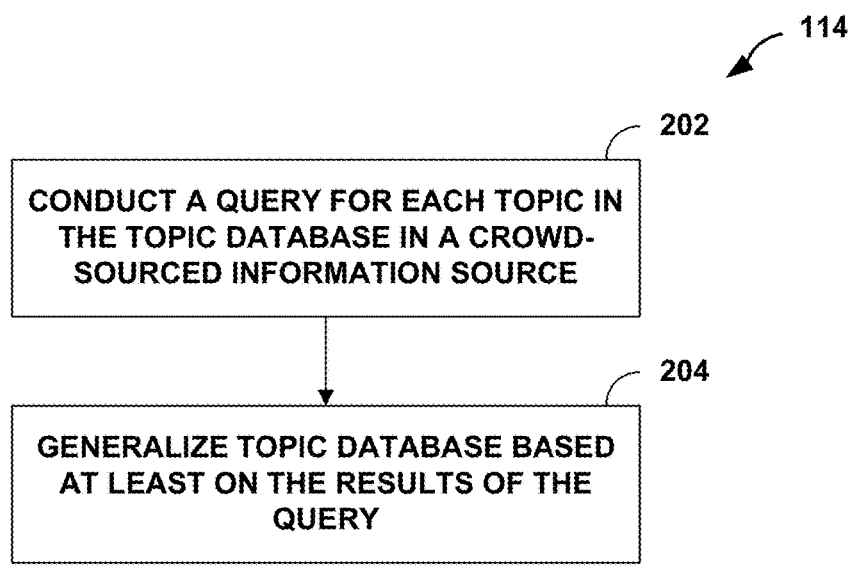
FIG. 4 is a flow diagram illustrating an example for normalizing a topic database when noise is present among the data.

FIG. 4 describes an example process by which database generation module 22 may remove noise from one or more databases using a crowd-sourced information source. As shown in the example of FIG. 4, database generation module 22 may search a crowd-sourced information source (e.g., Wikipedia™) for the retrieved personalized annotations (202), and refine the topic database 17 based at least in part on the results of the search query (204). For example, each topic in the topic database 17 may be queried as a Wikipedia item in a search engine which, in turn, returns a list of results from Wikipedia titles with which are related to the query. For example, the top three results of topic: "concurrency control and recovery" queried as a Wikipedia item in the Google search engine may be: "concurrency control," "distributed concurrency control" and "multiversion concurrency control." In some examples, database generation module 22 may store all results of the search, while in other examples, database generation module 22 may store only the most relevant results (e.g., the top result, the top five results, or other number of results). By retrieving human-generated topics and normalizing the topics through a crowd-sourced information source, database generation module 22 creates a robust set of up-to-date topics with which system 26 may then annotate an input item by minimizing the presence of noisy data.

Figure 5:
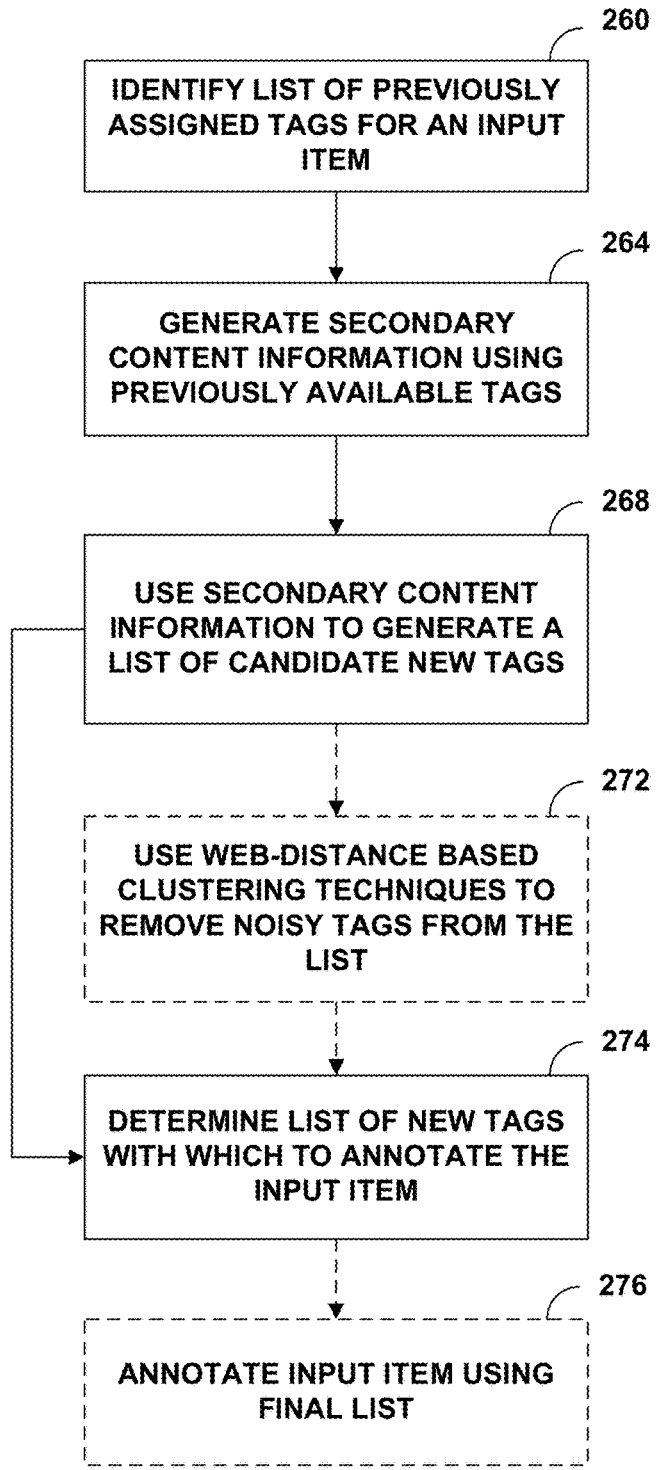
FIG. 5 is a flow diagram illustrating an example operation for determining tags of an input item.

FIG. 5 is a flowchart that provides another example of context generation module 12 generating the context for an item and determining new tags with which to annotate an input item 18. As described in FIG. 5, context generation module 12 may generate a context for an item that has at least one previously-defined tag by utilizing network 6 (e.g., using a commercially available search engine 7 such as Google™) based on a list of the previously defined tags for the item. Context generation module 12 adds the titles and "snippet" texts (e.g., brief excerpt of text) of the results to the context for the input item 18. In some examples, the context may include the title and snippet text of all the results. In other examples, the context may include the title and snippet text for only some of the results, such as the top ten results, the top fifty results, or some other amount of results.

In the first instance, tags (i.e. personalized annotations, labels, etc.) may be assigned for an input item 18 (e.g., a research document) based on the contents of the input item 18 wherein system 26 identifies these pre-assigned tags for processing. In the example of FIG. 5, the previously assigned tags/labels for an input item 18 are then used to generate and/or maintain a topic context database 19 specifying secondary content (e.g., text features) for an input item 18 (264). For example, the external data sources 24 may provide the universal source of all the text content. In some examples, a search engine 7 may be used to mine information from the external data sources 24 to generate the secondary content (i.e., context) for the items. The information from the search engine 7 is used to create text features which may further be used to find related tags as described herein.

In other words, text features for input item 18 may be generated using its user given tags as an input query to a search engine (e.g., Google search engine, Google Scholar search engine, etc.). For instance, the input query may be a tag list, such as "api, corpus, dataset." The text features may be generated from the results of the search engine query. For example, the text features may be constructed from the title of the retrieved results for the input query or from the "snippet" of text of the retrieved results, or any combination thereof. In another example, items such as the URLs may be excluded from the text features. For example, context generation module 12 may process the generated context to remove unimportant or unwanted information and/or to format the context. For instance, after obtaining the result titles and, in some cases, the result snippets, context generation module 12 may process the obtained text to remove HTML tags, common words, non-alphabetical characters, or other unwanted information. Context generation module 12 may parse the obtained text for formatting, such as tokenizing the text, adjusting capitalization, or performing other language processing. These unstructured text features may be referred to as the secondary content of an item.

While described in the example of FIG. 2 as generating the context for input item 18, context generation module 12 may, in some examples, generate the context for one or more other items, such as items stored in content database 16. That is, content database 16 may include one or more items. In some examples, content database 16 may include a respective context for each of the one or more other items. In some examples, context generation module 12 may generate the context for the one or more other items.

After generating a context for input item 18, context generation module 12 may provide the generated context to comparison module 14. In the example of FIG. 2, comparison module 14 may be operable to compare the context of input item 18 to the context of the one or more other items stored in content database 16.

FIG. 5 describes an example method for comparing contexts. As described in FIG. 5, each of the other items in content database 16 may also include previously-annotated tags. Comparison module 14, in such examples, generates a list of candidate tags by obtaining, from content database 16, all the items that have at least one tag in common with input item 18 (e.g., "common tag items"), and then collecting all the tags of those items.

In the example of FIG. 5, system 26 generates a list of new candidate tags using the secondary content information generated for an input item 18 and an associated user assigned tag list. For example, a database consisting of tagged dataset instances may be used (260). In some instances, the tagging may be complete for all the dataset instances in the database, while on the other hand, the tagging may be incomplete for one or more dataset instances in the database. Using the database of the tagged datasets, system 26 selects a set of new candidate tags for input item 18 from a list of tags available in the database. In some instances, comparison module 14 may use a similarity metric in selecting from the list. For example, just as the input item may be represented by its tag list (e.g., $L_i$), each item instance in the database should also be represented by its corresponding tag list (e.g., $L_j$, $i \neq j$). The new candidate tags for the input item are selected from the tags that are in the tag list of the input item (e.g., $\cup (L_j)$) for the item instances in the database wherein the target tag list and an instance in the tagged dataset should have one or more common tags (e.g., $L_i \cap L_j \neq \emptyset$ and $i \neq j$). Accordingly, the final candidate tag list should be a non-repetitive list of tags generated from the tag list in the database (e.g., $\cup (L_j)$).

In the example of FIG. 5, comparison module 14 ranks the tags in the final candidate list. For the input item instance 18, comparison module 14 constructs a matrix from the dataset instances in the database. In one example, the matrix may be a n×k matrix. In some examples, the first variable, n, may be the number of item instances in the database having at least one overlapping tag with the input item tag list. In addition, the second variable, k, may correspond to the number of total unique tags.

Comparison module 14 then ranks each of the candidate tags based at least in part on the semantic similarities between the context of input item 18 and the contexts of each of the common tag items. In the example of FIG. 5, the tags in the list may be ranked in decreasing order based at least in part on the respective calculated weights and selected as candidate new tags (268).

Figure 6:
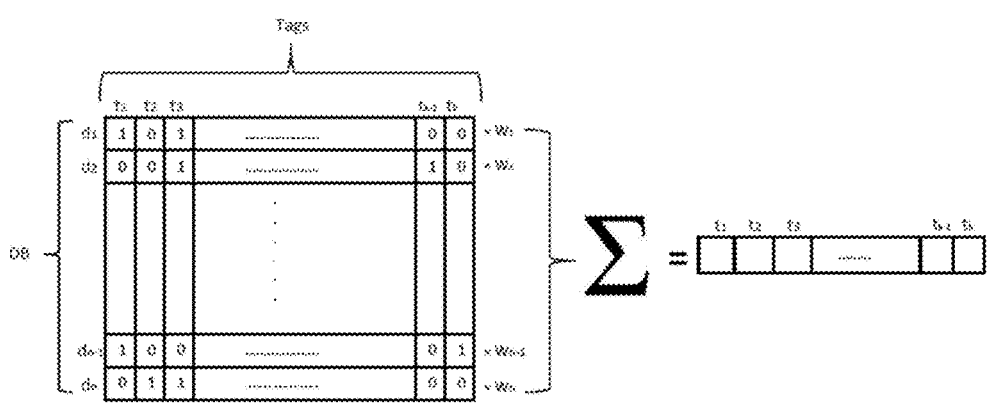
FIG. 6 is a logical diagram graphically illustrating example computation of weights for the candidate tags for an input item.

FIG. 6 is a logical diagram graphically illustrating example computation of weights for the candidate tags for an input item. In the example of FIG. 6, the presence of a tag for an item is denoted by a 0 or a 1 in the matrix. In some examples, the weights against an instance of an item in the database may be assigned by computing the similarity score based on the secondary contents of the input item and the one or more items in the database. For example, the similarity may be computed using the cosine similarity score between the TF-IDF vector representation of the respective secondary contents. As such, the final weight of each tag (e.g., $t_i$) in the list of candidate tags for the dataset instance may be computed as follows:

$$s(t_i) = \Sigma_{y=1}^{n}(M_{y,i} \times W_y)$$

Assigning tags based on similarity between the items may lead to introduction of noisy tags. In some instances, the introduction of noisy tags may cause topic drift wherein the tags do not represent the theme or topic of the item. In one example, unwanted content may be removed before computing the similarity score in weights against each item. In other examples, techniques using tag similarity metrics and Folk-LDA may be used to deal with the problem of topic drift for the expanded tags.

In some examples, after determining the new tags (e.g., metadata) with which to annotate input item 18, comparison module 14 outputs the metadata as results 20 (274). In some examples, comparison module 14 may annotate input item 14 to produce results 20 (276). That is, in various examples, results 20 may represent new information with which input item 18 should be annotated and/or input item 18 annotated with the new information.

Figure 7:
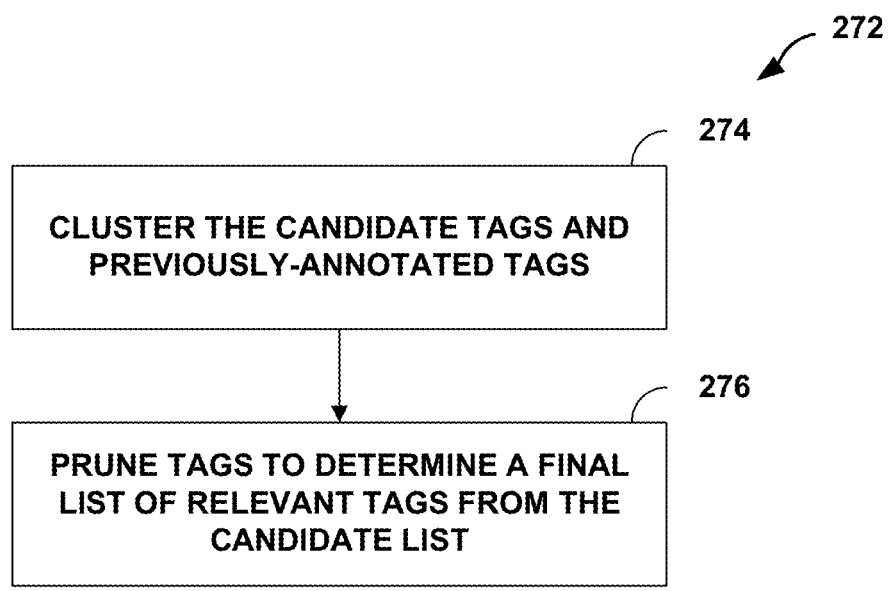
FIG. 7 is a flow diagram illustrating example operation for pruning noisy tags.

In some examples, comparison module 14 may prune noisy tags from a set of candidate tags (e.g., potential annotations to input item 18) by clustering each of the candidate tags, as well as the previously-annotated tags, in a semantic space (272). FIG. 7 describes an example process by which system 26 may prune noisy tags using certain clustering techniques.

In the example of FIG. 7, noisy tags may be pruned from the final list of predicted tags. In this example, comparison module 14 detects the noisy tags from the assigned list of tags without using any content information of the item. For instance, comparison module 14 may cluster the candidate tags and previously-annotated tags using a web-based distance metric (274). In other words, comparison module 14 may use the technique of clustering based on a web based distance metric given the user assigned tag list for an item and the list of candidate new tags. The pairwise distance between all the tags (the user assigned tag list and the new candidate tags) is used to cluster the tags into clusters. For example, the pairwise distance may be used to cluster the tags into two clusters using the hierarchical clustering technique. The distance function between tags may be determined by, for example, calculating the Normalized Google distance (NGD) between the tags using the following equation:

$$NGD(t_1, t_2) = \frac{\max\{\log f(t_1), \log f(t_2)\} - \log f(t_1, t_2)}{\log Z - \min\{\log f(t_1), \log f(t_2)\}}$$

In the equation above, $t_1$ and $t_2$ represents tags; Z is the total number of web pages indexed by the search engine; f ($t_1$) and f ($t_2$) are the number of hits for search terms $t_1$ and $t_2$, respectively; and f ($t_1$, $t_2$) may be the number of web pages on which both $t_1$ and $t_2$ occur simultaneously.

The distance function between tags should represent a measure of semantic relatedness of any two words. Computing semantic relatedness between two words is addressed in several different ways. For example, based on a human judgment based evaluation, distributional measures such as the NGD perform better among all the semantic relatedness techniques. As such, using the NGD metric as the distance function may work with flat text input since it does not require any vector representation of the words and may allow the choice of words to be practically infinite since the World Wide Web corpus is used to compute word frequencies.

In the example of FIG. 7, comparison module 14 first identifies the noisy tags by means of clustering around the user assigned tags. The tags which fall in one or more clusters other than the one or more clusters that contain the original user assigned tags are considered noise tags. Clustering using semantic relatedness of tags should yield groups of tags which belong to the same topic or theme. In another example, the user assigned tags may be distributed in different clusters which may signify a lack of single topics in the tags in which case, the candidate tags should not be pruned. The tags in the noisy cluster may be pruned to determine a final list of relevant tags from the candidate list (276).

Figure 8:
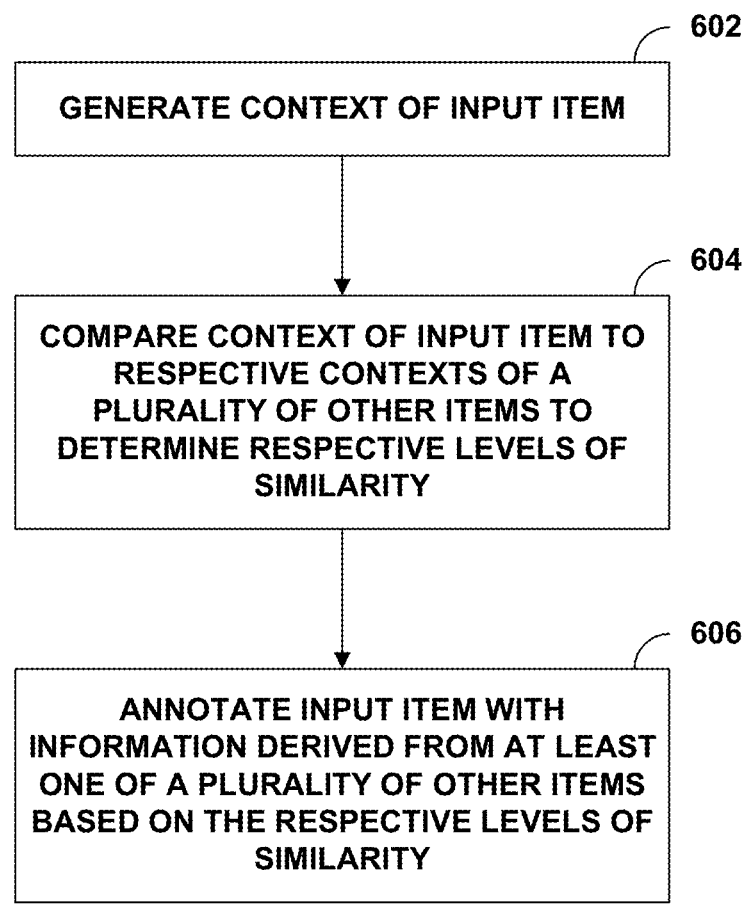
FIG. 8 is a flow diagram illustrating example operations for automated item annotation in accordance with one or more techniques of the present disclosure.

FIG. 8 is a flow diagram illustrating example operations for automated item annotation in accordance with one or more techniques of the present disclosure. For purposes of illustration only, the example operations of FIG. 8 are described below within the context of FIGS. 1 and 2.

In the example of FIG. 8, system 26 generates a context of an input item (602). In some examples, system 26 may generate the context based at least in part on information about the input item, such as a title, previously-annotated metadata or tags, or other information.

System 26, in the example of FIG. 8, may compare the context of the input item to respective contexts of a plurality of other items to determine respective levels of similarity between the input item and the plurality of other items (604). For instance, computer 500 may generate a vector that represents the semantic makeup of each context, and determine the cosine similarity between vectors.

In the example of FIG. 8, system 26 may annotate the input item with information derived from at least one of the plurality of other items, based at least in part on the respective levels of similarity between the input item and the at least one of the plurality of other items (606). In some examples, such as where the other items are topics, system 26 may annotate the input item with the other items that have a context that is most similar to the context of the input item. In some examples, such as where the other items were previously annotated with metadata, system 26 may determine potential tags with which to annotate the input item, then rank the potential tags based at least in part on the similarity between the contexts of the other items that are tagged with the potential tags and the context of the input item.

Figure 9:
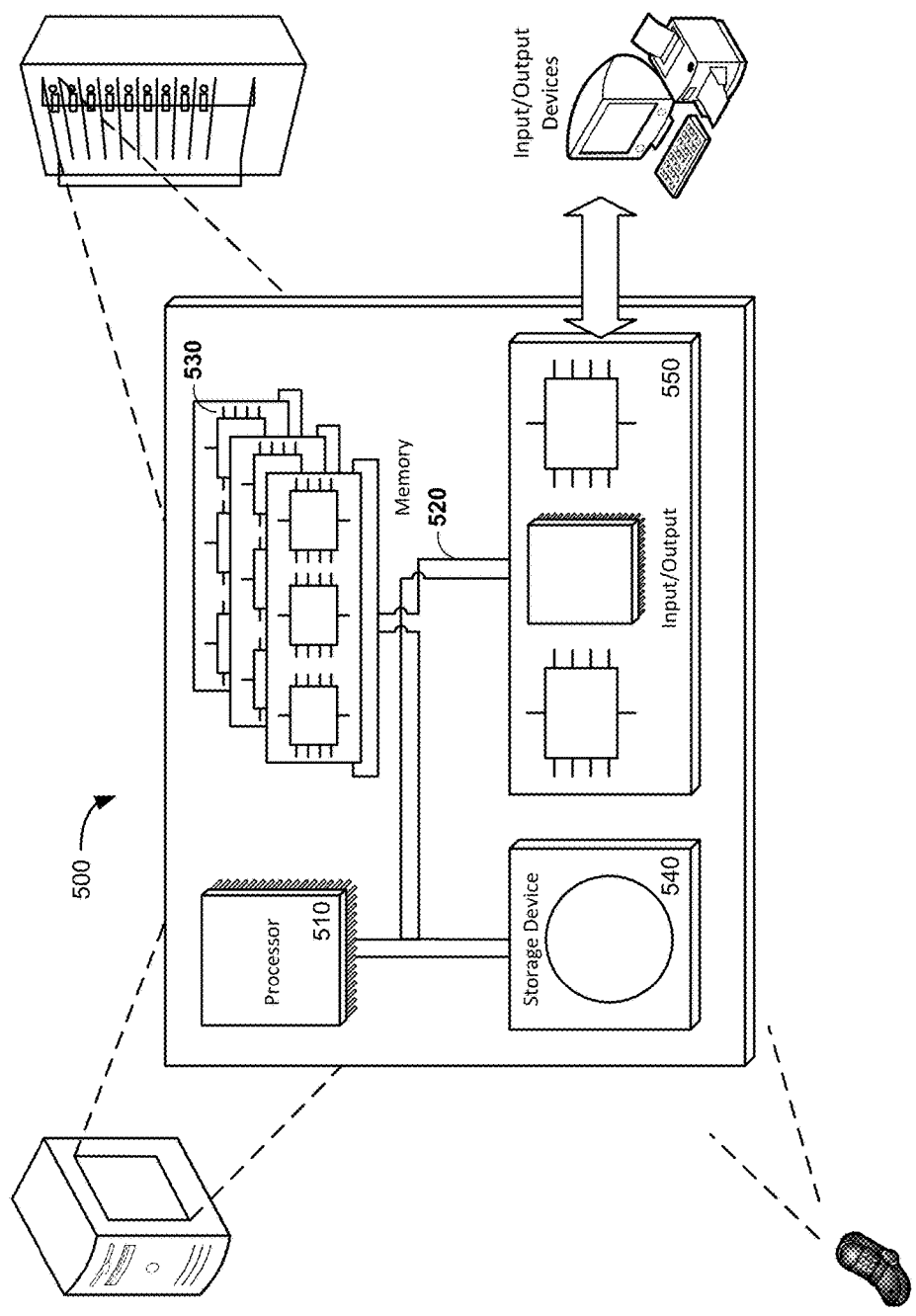
FIG. 9 is a block diagram showing a detailed example of various devices that may be configured to implement some embodiments in accordance with one or more techniques of the present disclosure.

FIG. 9 is a block diagram showing a detailed example of various devices that may be configured to implement some embodiments in accordance with one or more techniques of the present disclosure. For example, device 500 may be a laptop computer, a mobile device, such as a mobile phone or smartphone, a workstation, a computing center, a cluster of servers or other example embodiments of a computing environment, centrally located or distributed, capable of executing the techniques described herein. Any or all of the devices may, for example, implement portions of the techniques described herein for generating and/or analyzing contexts for input content.

In the example of FIG. 9, a computer 500 includes a processor 510 that is operable to execute program instructions or software, causing the computer to perform various methods or tasks, such as performing the techniques for generating metadata, such as tags, for input content using context as described herein. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data of the content database, and other information. The computer also includes various input-output elements 550, including parallel or serial ports, USB, Firewire or IEEE 1394, Ethernet, and other such ports to connect the computer to external devices such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer, in some examples, may include fewer than all elements listed above, such as a thin client or mobile device having only some of the shown elements. In another example, the computer is distributed among multiple computer systems, such as a distributed server that has many computers working together to provide various functions.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Various examples have been described. These and other examples are within the scope of the claims below.

EXPERIMENTAL RESULTS

This section describes experimental results from an experimental design used to evaluate the performance of the techniques illustrated by FIGS. 3 and 4 for automatic document summarization. The test dataset, the ground truth, the baseline and the evaluation metric used for evaluation of the algorithm are described herein.

For the purpose of evaluating the approach illustrated by FIGS. 3 and 4, a test set consisting of fifty research documents from top tier computer science conferences was constructed. The fifty papers were selected to capture the variety of documents in computer science research. For example, several of the documents had catchy titles (examples given in Table 2 below) and the titles were never intended to convey the core idea of the document. In the algorithm, only the title information was used as the input item. For the baseline approaches, the entire content information of these fifty documents was used.

The topic generation was initiated by the conference names in which these fifty papers were published. A total of seven-hundred and seventy-seven topics were generated using the approach illustrated by FIG. 3. Relevant topics out of these seven-hundred and seventy-seven topics were assigned to the fifty papers in the test set.

In absence of any gold standard annotations for the test documents, the ground truth for the documents was collected from the keywords that the authors assigned to these documents. This information was collected by parsing the fifty documents in the test set. The keywords that were assigned were assumed to be representative of the annotations for the document. The disclosed approach and the baselines were evaluated on this ground truth.

The performance of the approach illustrated by FIG. 3 was compared (based on automatic topic generation and global context matching for topic assignment) with two baselines which use only the local content information for topic assignment. The first baseline used only the title and abstract information about the document to identify relevant topics from a given list of topics. This list of topics for the baselines was available in faceted DBLP™ project. This list contained the most popular author keywords assigned to a minimum of one-hundred research articles in the DBLP dataset. The keywords in the list, unlike those used in the disclosed approach, were actually human generated keywords/topics. The second baseline used the entire content of the documents (title, abstract and all the other section). The keywords assigned to the paper were removed while taking into account the full content of the documents. A Term Frequency-Inverse Document Frequency (TF-IDF) model was used to vectorize each of the test documents in terms of the keywords. Using the top ten highest TF-IDF values, ten keywords were assigned to each document from the list of given keywords.

The results of the approach were evaluated using recall metric. Recall was used to compute the proportion of the ground truth results that was correctly identified in the retrieve results. The predicted annotation term for a document was considered correctly identified if the exact term was present in the ground truth annotation terms for the document. Each document was marked to be labelled correctly if at least one of the retrieved/predicted topics (i.e., annotation terms) exactly matches with the ground truth for the document. The disclosed approach and the baselines were evaluated on the same metric.

TABLE 1

Comparison of recall for the baselines ($BS_{abs}$, $BS_{whole}$) using only the local context information for document summarization and the disclosed approach ($PA_{TF-IDF}$, $PA_{LDA}$, $PA_{LSI}$) which uses global context generated using search engines in the top ten results.

| | Annotation techniques | | | | |
|---|---|---|---|---|---|
| | $BS_{abs}$ | $BS_{whole}$ | $PA_{TF-IDF}$ | $PA_{LDA}$ | $PA_{LSI}$ |
| Recall for top ten | 0.50 | 0.50 | 0.56 | 0.50 | 0.50 |

The quantitative results of the experiments are discussed in the following paragraphs. Table 1 gives a summary of the recall in the top ten results obtained using the disclosed approaches and the baselines. As shown in Table 1, the recall in the top ten results improves (0.56 vs. 0.50) when using techniques described in FIG. 3 and FIG. 4 (using TF-IDF model for comparing content similarity). In addition, the recall using the disclosed approach was comparable to the baseline approaches (approx. 0.50 in both cases). The comparable results signify the effectiveness of the fully automated approach to identify topics for research documents. Thus, given only the title information about a research document, one or more topics may be automatically assigned to the one or more documents which are substantially equivalent to one or more alternative personalized annotations (e.g., human assigned topics).

Figure 10:
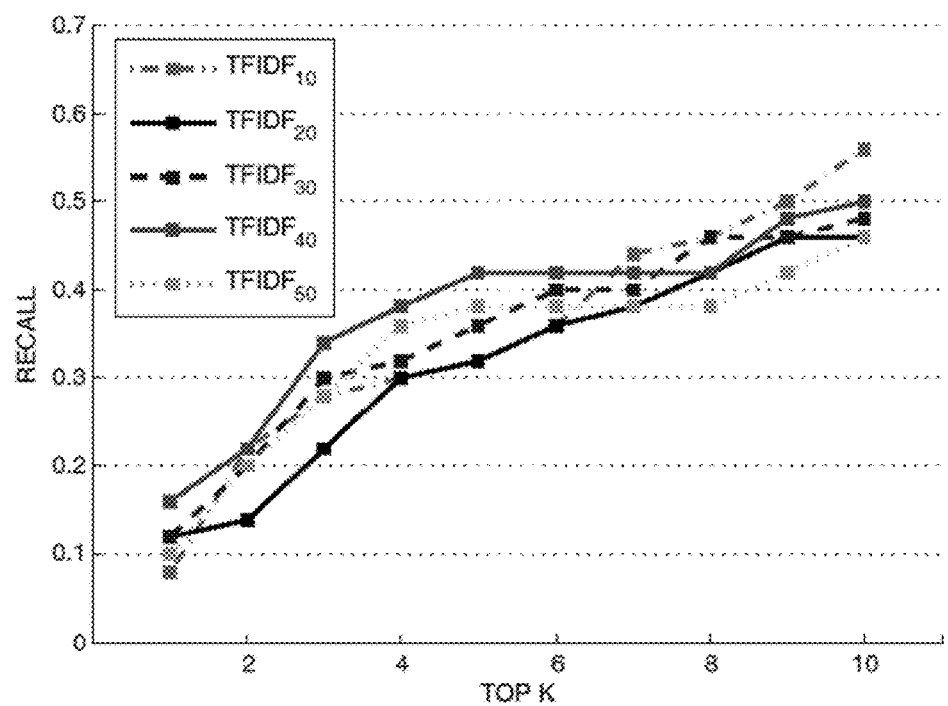
FIGS. 10-12 are graphs illustrating experimental results of a first embodiment in accordance with one or more techniques of the present disclosure.
Figure 11:
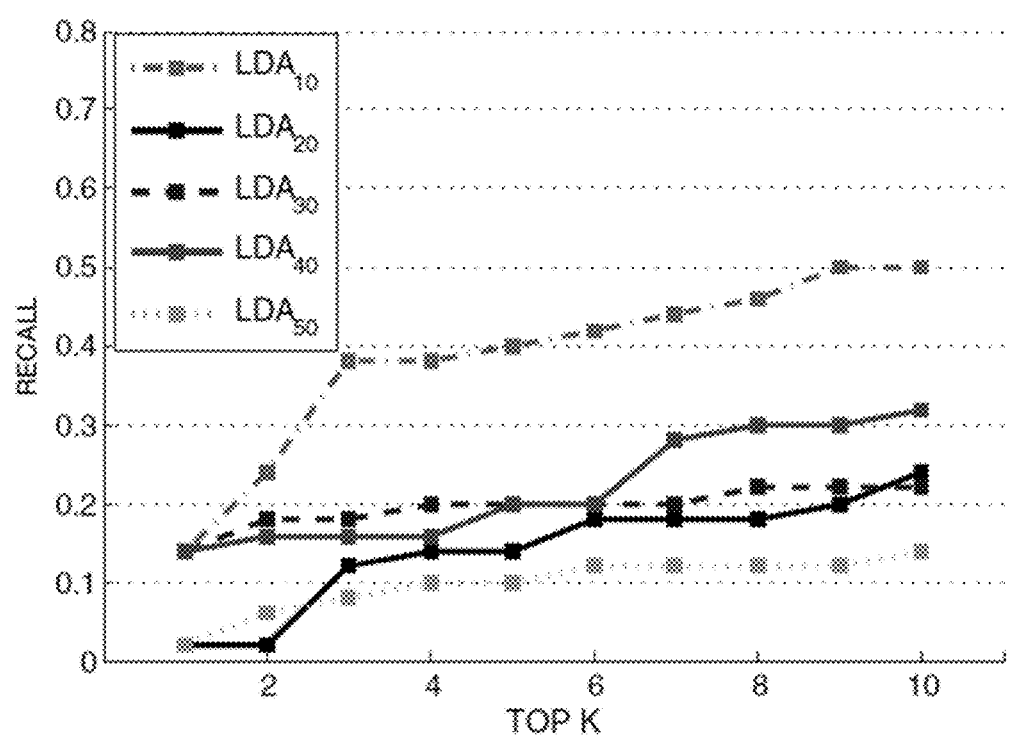
Figure 12:
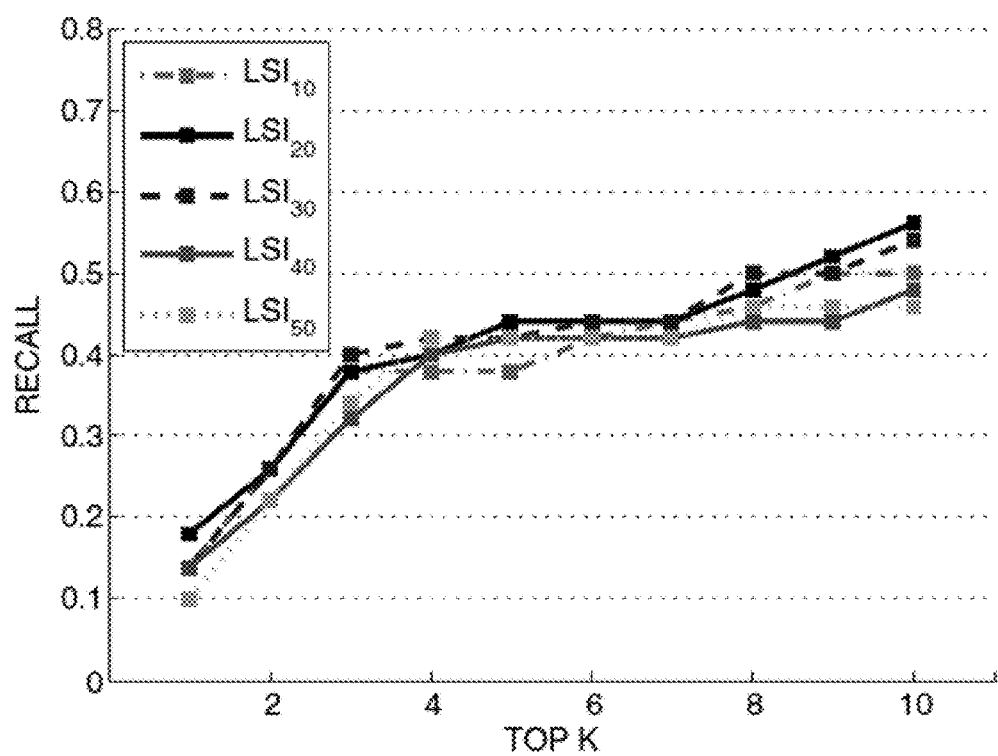

In the next set of experiments, the global context size was varied from ten to fifty in increments of ten. FIGS. 10-12 are graphs illustrating experimental results of the embodiment as illustrated by FIGS. 3-4. As such, FIGS. 10-12 illustrate the variation of recall in the top-k results of the different approaches. As illustrated by FIGS. 10-12, the recalls were also compared in the presence of varying global context sizes. In FIG. 10, the recall increased monotonically in all the different global context sizes. The highest recall (0.56) using TF-IDF model occurred in the top ten and using the global context of size ten. The context size of forty provided the next best recall. However, the recall was observed to be lower in comparison with other context sizes when extra context was added (e.g., context size 50-$TF-IDF_{50}$).

In FIG. 11, a significant difference in the performances was observed by varying the context size. The highest recall attained using LDA model was 0.50 and occurred when the context size was ten. From FIG. 11, the LDA model proved to be sensitive to the content information. For example, as shown in FIG. 10, the recall decreased to less than 0.20 when extra content was added (e.g., $LDA_{50}$).

In FIG. 12, a similar trend was observed in performances using different context sizes in the case of using the LSI model for similarity evaluation. For example, the recall for context sizes of forty and fifty (e.g., the $LSI_{40}$ and $LSI_{50}$ curves respectively) was lower in comparison to the recall using a context size of ten, twenty or thirty. However, the highest recall (0.58) was attained when the context size was twenty.

The qualitative results of the experiments were analyzed in a subjective manner and are discussed in the following paragraphs since using quantitative measurements (e.g. recall) fails to account for the subjective accuracy of other topics assigned to a document in our top ten results when compared to the ground truth by excluding the exact match scenario.

TABLE 2

Topics assigned to the documents with catchy titles.

| Document titles | Disclosed approach | Ground truth |
|---|---|---|
| Sic transit gloria telae: towards an understanding of the web's decay | link analysis, adversarial information retrieval, Bayesian spam filtering | link analysis, Web information retrieval, Web decay, dead links |
| Visual encoding with jittering eyes | semantic memory, bag-of-words model, motion analysis, computer vision | information retrieval, personal information management, human-computer interaction, World Wide Web use |
| BuzzRank . . . and the trend is your friend | PageRank, web community, e-social science | Web graph, Web dynamics, PageRank |

Table 2 illustrates the results of summarization using the disclosed approach illustrated by FIG. 3 and the ground truth keywords. In addition, Table 2 illustrates a special category of documents where the titles of the document were "catchy" and not intended to display the core idea of the document. The disclosed algorithm used only this title information to generate the context and find topics suitable for these documents. The second column shows that some of the results from the disclosed approach were in the top ten. In the first example, the term "link analysis" was common in both the ground truth and when disclosed approach was used. In the next example, the topic "motion analysis" and "computer vision" were closely related to "human-computer interaction." Similarly, "bag-of-words model" was frequently used in "information retrieval." In the third example, the topics "web community" and "e-social science" were both closely related to "web graph" and "web dynamics."

TABLE 3

Results for a number of the sample documents.

| Document titles | Disclosed approach | Ground truth |
|---|---|---|
| The Impact of Diversity on Online Ensemble Learning in the Presence of Concept Drift | concept drift, fuzzy concept, incremental decision tree, feature learning | Concept drift, on-line learning, neural network ensembles, diversity |
| Advances in Phonetic Word Spotting | information retrieval, semantic search, multimedia information retrieval, automatic content extraction | speech recognition, synthesis Text analysis, Information Search and Retrieval |
| Mining the peanut gallery: opinion extraction and semantic classification of product reviews | sentiment analysis, information extraction, text mining, document classification | Opinion mining, document classification |

TABLE 3-continued

Results for a number of the sample documents.

| Document titles | Disclosed approach | Ground truth |
|---|---|---|
| Quality-aware collaborative question answering: methods and evaluation | question answering, intelligent community, information quality management, context-aware pervasive systems | Question answering, expertise, answer quality |

In Table 3, the analysis was extended to a number of documents wherein the titles, shown in the first column, captured the general concept of the document. Several examples in the test set were indicative of topics that described the content of the respective document adequately. In one example, the topic "incremental decision tree," shown in the second column, is used in "online learning" (third column) Similarly, the topic "fuzzy concept" is a characteristic of "neural network ensembles." In the second example, topics like "multi-media information retrieval" and "semantic search" are relevant to the title of the document. In the third example, the topic "sentiment analysis" is a well explanatory categorization of the document. The ground truth keyword, "opinion mining," is a sub-category in "sentiment analysis." In the fourth example, the topics "information quality management" and "context-aware pervasive systems" are essential characteristics of a community based "question answering system."

In another example experiment, the automating tag expansion for low-content items algorithm, illustrated by FIG. 5-7, was tested and the results provided herein. The following components of the experimental design are discussed in the following paragraphs: dataset description, evaluation metrics and the baseline approaches.

The dataset for this experiment was collected from a data mining blog. The blog consisted of three-hundred and ninety-eight research dataset instances along with user provided tags. The dataset instances in this collection were related to machine learning, however many government, finance and search datasets were included as well. A sample of this data was extracted in accordance with the techniques described herein.

The dataset consisted of approximately seven-hundred and ten unique tags. In addition, several of the tags were morphological variants of words with similar semantic interpretations. The morphological logical variants were removed using the process of stemming using an nltk Porter algorithm to determine a reduced tag set of six-hundred and fifty-seven unique tags.

Figure 13:
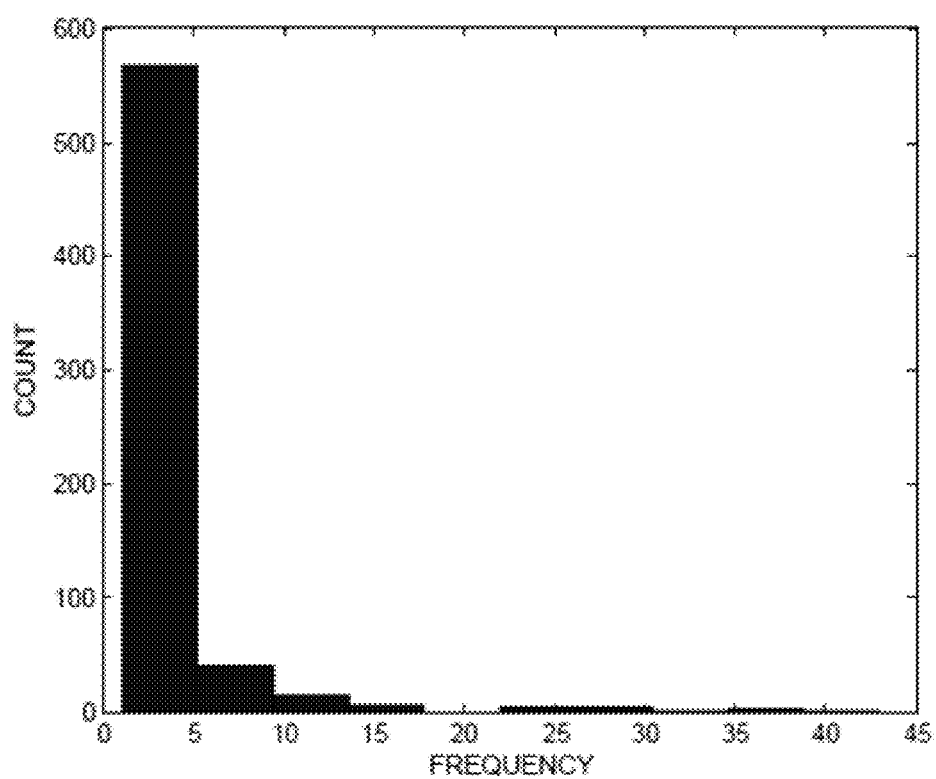
FIGS. 13 and 14 are graphs illustrating example tag counts and frequency of tags.
Figure 14:
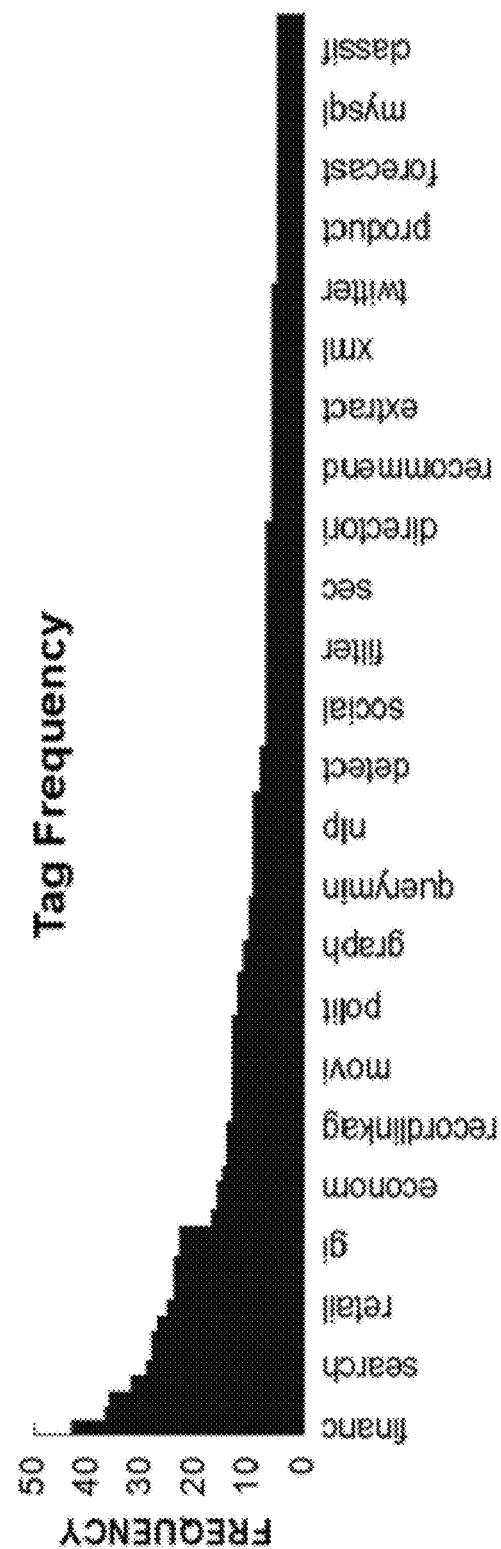

Instances in the dataset with high frequency tags were used to provide the sample data (e.g., tags which were used at least ten times for tagging instances in the dataset). FIGS. 13 and 14 illustrate the histograms for tag count and the frequency of tags against the tag labels respectively. In total, thirty-six of the tags were considered high frequency tags. The less frequent tags were removed from further analysis.

The sample data was divided into training and testing sets. For example, each item instance in the dataset was represented by a number of tags. The testing instances were generated by using what is known as the "leave-one-out" technique for selecting the testing set for each item instance, wherein one tag from the user provided list of tags may be randomly selected as the test tag (e.g., the tag to be predicted), and the remaining tags for the instance are then considered the training set. In order to remove any potential bias, three sets of training and testing data were constructed by performing the leave-one-out sampling technique three times. The tags in the training set were called the user assigned tags and the tags in the test set were the expected tags or the ground truth tags for the instances in the dataset.

Six baselines were used which may closely compare with the disclosed approach. The baseline approaches make tag prediction may use the same input as was used for the disclosed approach. For the first baseline, a random tag generator randomly selects 10 tags from a pool of the high frequency tags for each dataset instance. The tags generated by the random generator do not overlap with the user assigned tags for the dataset instances. In the second baseline, a CF-mm algorithm was used to predict new tags for a test instance, also known as a non-negative matrix factorization (NMF) type approach. In order to use a CF-mm algorithm, a matrix, M×N, was generated for each test case wherein M corresponds to the dataset instances such that there are M−1 tagged dataset instances in the system and one test dataset with user assigned tags, and wherein N was the total number of tags such that a dataset instance (e.g., a row) may be filled with 1 in the column corresponding to its assigned tags. For each instance in the resultant output matrix, the columns which scored high (e.g., in the top ten) were used as the new predicted tags for the dataset instance. The third baseline used a CF-cjlin algorithm which solves the NMF problem by alternative non-negative least squares using projected gradients. The fourth baseline used a CF-prob algorithm which solves the NMF problem by assuming the input matrix was a sample from a multinomial. The fifth baseline used a CF-als algorithm which solves the NMF problem by alternatively solving the least square equations for input matrix factors wherein all the negative elements are set to zero. The CF-mm, CF-cjlin, CF-prob, and the CF-als algorithms were run with the following parameters: matrix factorization using twelve components and maximum iterations was one-thousand. In addition, the same setting of matrix construction was used for these four algorithms. The sixth baseline used a WikiSem approach which uses Wikipedia as a way to compute semantic similarity between words. In order to create a meaningful baseline for comparison, a semantic similarity finding tool, DISCO with Wikipedia database, was used. For each dataset instance (e.g., $d_i$), new tags were assigned from the pool of high frequency tags by computing the first-order semantic similarity of the tags with the user assigned tags for the dataset instance. For example, a tag (e.g., $t_i$) in the pool would be ranked based on an aggregated similarity score with all user assigned tags for the dataset. For example, a tag with higher aggregated similarity score may be ranked higher.

The following evaluation metrics were used to compare the effectiveness of all the approaches: Mean Reciprocal Rank (MRR), Percentage reduction and Reduction error (RE). The MRR represents the efficiency of the disclosed approach to retrieve relevant tags. The percentage reduction measures the percentage of the predicted tags that were removed by the pruning algorithm described herein. The reduction error measures the percentage of correct tags (ground truth tags) that were pruned out, and was defined as:

$$RE = \frac{\sum_{i=1}^{N} |P_i \cap GT_i|}{\sum_{i=1}^{N} |GT_i|}$$

In the reduction error equation, N is the total number of instances in the test data, $P_i$ is the set of pruned tags for dataset instance, i, and $GT_i$ is the set of correct tags for dataset instance, i.

TABLE 4

Table showing the MRR results for tag expansion using different pruning criteria.

| Pruning | Clustering Algorithm | Google DB | GScholar DB | Rand-Tag | Wiki-Sem | CF-mm | CF-cjlin | CF-prob | CF-als |
|---|---|---|---|---|---|---|---|---|---|
| Un-pruned | unpruned | 0.308 | 0.167 | 0.079 | 0.131 | 0.113 | 0.114 | 0.072 | 0.116 |
| NGD based | complete | 0.264 | 0.127 | — | — | — | — | — | — |
|  | single | 0.250 | 0.133 | — | — | — | — | — | — |
|  | average | 0.255 | 0.131 | — | — | — | — | — | — |

Table 4 summarizes the comparison of the disclosed approach with the different baselines based on the MRR metric. As shown in the table, the MRR values at the unpruned stage show the effectiveness of the disclosed approach over the baselines. Using a Google database (DB) for content generation, the average MRR value was approximately 0.308 (i.e., on average bases the exact tag was predicted within top-3.33 of the predicted tag list). The MRR value was 0.167 using the Google Scholar database (GScholar DB) as the source for content generation. The differences in the two results of the two databases can be attributed to the tag names being of general type than being academic terms. However, in comparison to the baseline approaches, the MRR values in the disclosed approach are significantly higher. For the RandTag baseline, the MRR value was as low as 0.079. For the WikiSem baseline, the MRR value was 0.131. In comparison to the WikiSem approach, the disclosed approach was performing at least two times better in terms of the MRR value.

Among the NMF based baselines, the MRR values are distinctively lower in comparison to the results of the disclosed approach. The highest MRR value for any NMF baseline was only 0.116 and that was using CF-als.

TABLE 5

Reduction (% error) results for tag expansion using different pruning criteria.

| Pruning | Clustering Algorithm | Google DB (error) | GScholar DB (error) |
|---|---|---|---|
| NGD based | complete | 17.091% (1.449%) | 14.947% (3.260%) |
|  | single | 11.955% (1.449%) | 12.110% (2.173%) |
|  | average | 12.844% (2.174%) | 13.571% (2.899%) |

Table 5 illustrates the evaluation results for the noise pruning approaches. For the Google database, the complete hierarchical clustering approach for pruning produced the best results among the three clustering algorithms. Compar-ing the Google and Google Scholar database, Google database, in general, was more suitable for tag expansion.

TABLE 6

Examples of tag prediction for well known dataset.

| Dataset name | User assigned tags | Expected tag | Predicted tags |
|---|---|---|---|
| Wikipedia link | link, graph, network | wikipedia | web, api, machine learning, corpus |
| YouTube | web, network | graph | graph, link, api, machine learning |

TABLE 6-continued

Examples of tag prediction for well known dataset.

| Dataset name | User assigned tags | Expected tag | Predicted tags |
|---|---|---|---|
| Wikitech | trend, wikipedia | text mining | search, api, queries, text mining, text, link, google |
| CiteULike | record linkage, networks | graph | name, text, rdf, corpus, google, economic |
| Enron Email | network, text | corpus | link |

Table 6 illustrates the results of tag expansion for a sample instances in the dataset. For example, the tags predicted for Wikipedia link dataset, such as "web" and "corpus," might be relevant for the dataset even though an exact match was not produced. For the "YouTube" dataset, the tag "graph" was an exact match. Moreover, tags such as "link" and "machine learning" may also be relevant. Similarly, for the "Wikitech" dataset, the "text mining" tag was an exact match whereas other tags like "search," "queries," or "text," may also be of interest.

The user assessment was performed in two folds. The first part of the assessment was to generate new ground truth data for comparing the results of the baseline approaches with the disclosed approach. In the user assessment, unlike the previous evaluation where the ground truth was constructed from the user given tags, multiple human subjects were provided a sample of instances (e.g., dataset names) along with the original user assigned tag list. In order to collect new tags for each instance, a list of thirty-six unique tags was also provided to the subjects. Each subject was asked to assign, at most, five best fit tags for the dataset instance. The dataset names were also accompanied with an associated URL to assist in tag selection. The study was conducted for fifteen instances from a total of ninety-two instances in the dataset. The new ground truth tags for the fifteen instances were obtained by aggregating all the tag preferences provided by users for each instance. For each dataset instance, the tags in ground truth were ranked based on the aggregation of rater votes given to the different tags. The most preferred tag was ranked high in the ground truth. The ground truth did not contain tags present in the original user assigned tag list.

Figure 15A:
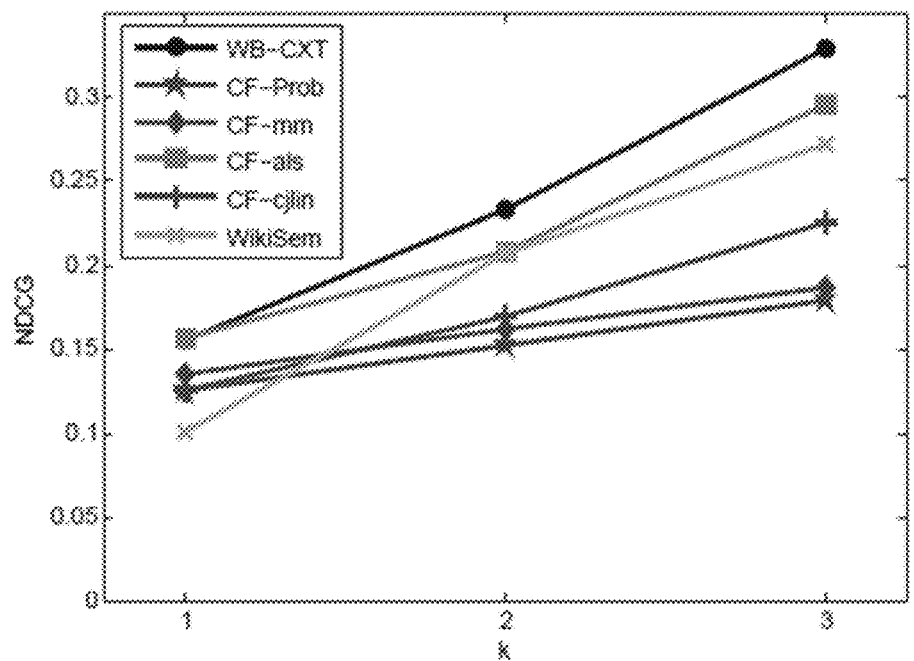
FIGS. 15(a) and 15(b) are graphs illustrating experimental results of a second embodiment in accordance with one or more techniques of the present disclosure.
Figure 15B:
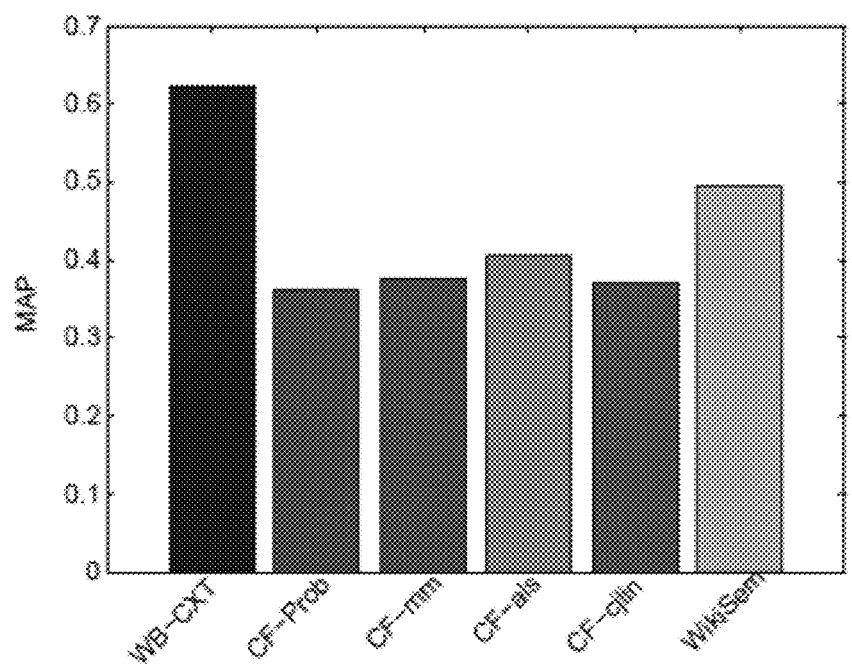

FIGS. 15(a) and 15(b) illustrate the evaluation results for the disclosed approach and the baselines using the new ground truth data. Since the ground truth data was a ranked list of expected tags, NDCG@k (k=1,2,3) was used and MAP metrics for comparing the performance of different approaches. As shown in FIG. 15(a), the disclosed approach (WB-CXT) performed better than both the NDCG@2 and the NDCG@3. The NDCG@3 for WB-CXT was 16% higher than NDCG@3 for CF-als. The NDCG@1 was comparable for the WB-CXT approach and the CF-als approach (0.15). Amongst the baselines, the CF-als performed significantly better than all other CF based approaches.

As shown in FIG. 15(b), the different approaches using the MAP metric were compared. As shown in FIG. 15(b), the WB-CXT approach clearly outperformed all the baselines with respect to the MAP metric. The MAP metric value for the WB-CXT approach was 0.62 while the MAP value for the best baseline (WikiSem™) was 0.49. The disclosed approach indicates an improvement of approximately 12% in MAP value in comparison to the WikiSem baseline.

Figure 16:
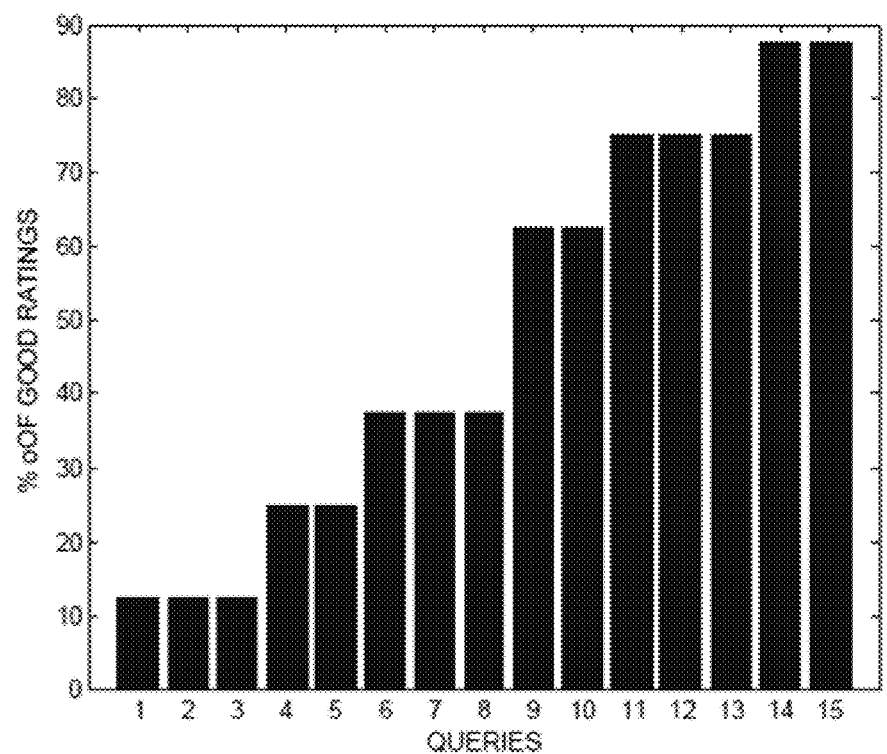
FIG. 16 is a graph illustrating subjective opinions about the quality of prediction results obtained while evaluating the second embodiment.

In the next user assessment study, a new experiment to collect a subjective opinion about the quality of prediction results for the disclosed approach was conducted. In this user study, the human subjects were provided with the same set of fifteen dataset instances. The questionnaire contained a dataset name, its URL, user assigned tags and predicted tags and a user rating scale. A total of eight graduate students participated in the assessment. Each instance was rated on a Likert like scale. A rating of five indicates highest satisfaction while one indicates lowest satisfaction for the rater. A rating of four or above was considered "good," while the rest of the ratings scores did not reflect good confidence in the quality of the predicted tags. FIG. 16 illustrates the results of the evaluation. As shown in FIG. 16, seven out of the fifteen instances under evaluation were given very good ratings by the subjects. In these instances, the proportion of good ratings was above 60% signifying a higher agreement between the raters about the quality of the tags.

Example 1: A method comprising: generating, by a computing device and based at least in part on a user assigned tag for an input item, secondary content information for the input item; generating, by the computing device and based at least in part on the secondary content information, a list of candidate new tags for the input item; and removing, by the computing device, noisy tags from the list of candidate new tags using a web distance-based clustering technique.

Example 2: A method comprising: generating, by a computing device, a topic corpus for use in annotating input items, the topic corpus comprising at least one topic; constructing, by the computing device a global context for each topic in the topic corpus; and ranking, by the computing device, each topic in the topic corpus by comparing the global context for the topic to a global context for the input item.

What is claimed is:

1. A method for improving search and retrieval of input items being published to a computer network, the method comprising:
while publishing an input item to the computer network:
generating, by a content generation module executing at a computing device and based at least in part on information about the input item, a descriptive context of the input item by at least:
performing a query for the input item by searching an academic database that includes at least one of: books, research papers, or journal articles or searching the Internet using a publicly available search engine; and
adding, to the descriptive context of the input item, at least one textual item from a response to the query for the input item;
comparing, by a comparison module executing at the computing device, the descriptive context of the input item to respective descriptive contexts of a plurality of other items previously published to the computer network to determine, using a text similarity model, respective levels of similarity between the descriptive context of the input item and the respective descriptive context of each of the plurality of other items, wherein each of the plurality of other items is already tagged with one or more existing tags that a search engine searches when performing a query on the computer network;
automatically tagging, by the content generation module, and based at least in part on the respective levels of similarity between the descriptive context of the input item and the respective descriptive context of each of the plurality of other items, the input item with at least one existing tag from the one or more existing tags that a particular content item from the plurality of content items is tagged; and
after automatically tagging the input item, automatically publishing, by the computing device, the item to the computer network.

2. The method of claim 1, further comprising:
generating, by the computing device, the respective descriptive contexts of each the plurality of other items.

3. The method of claim 1, wherein comparing the descriptive context of the input item to the respective descriptive contexts of each of the plurality of other items to determine the respective levels of similarity between the input item and each of the plurality of other items comprises:
generating, based at least in part on the descriptive context of the input item, a vector representing a semantic makeup of the descriptive context of the input item; and
determining respective cosine similarities between the vector representing the semantic makeup of the descriptive context of the input item and each of a plurality of respective vectors representing respective semantic makeups of the respective descriptive contexts of the plurality of other items.

4. The method of claim 3, wherein the vector representing the semantic makeup of the descriptive context of the input item comprises at least one of: a Term Frequency-Inverse Document Frequency (TF-IDF) vector, a Latent Dirichlet Allocation TF-IDF (LDA-TFIDF) vector, or a Latent Semantic Indexing TF-IDF (LSI-TFIDF) vector.

5. The method of claim 1, wherein the plurality of other items comprises a plurality of topics, and wherein tagging the input item with at least one existing tag from the one or more existing tags that the particular content item from the plurality of content items is tagged comprises tagging the input item with at least one topic from the plurality of topics.

6. The method of claim 1, wherein the plurality of other items comprises a plurality of topics, the method further comprising generating the plurality of topics by:
performing a topic query for each potential topic from a set of potential topics using the potential topic; and adding, to the plurality of topics, at least one item from a respective response to the topic query for the potential topic.

7. The method of claim 6, further comprising obtaining the set of potential topics from a database of research requests.

8. The method of claim 6, wherein performing the respective query for the potential topic comprises searching a crowd-sourced information site using the potential topic.

9. The method of claim 1, wherein the plurality of other content items comprises a subset of content items, the method further comprising:
  determining, as part of the subset of content items, each content item from the plurality of other content items that is tagged with at least one existing tag with which the input item is also tagged;
  generating, based at least in part on the one or more existing tags with which each of the subset of content items is tagged, a set of candidate tags; and
  ranking, based at least in part on the respective levels of similarity between the input item and each of the subset of content items, the set of candidate tags to form a ranked set of candidate tags,
  wherein tagging the input item is based at least in part on the ranked set of candidate tags.

10. The method of claim 9, further comprising:
  clustering the set of candidate tags in a semantic space; and
  pruning, based at least on the clustering, the set of candidate tags by retaining only candidate tags that are contained within a particular cluster, the particular cluster containing existing tags of the input item.

11. The method of claim 10, wherein clustering the set of candidate tags comprises clustering the set of candidate tags using a web-distance metric.

12. The method of claim 1, wherein the input item comprises a research paper.

13. The method of claim 1, wherein the information about the input item comprises a document title.

14. The method of claim 1, wherein the information about the input item comprises an existing tag with which the input item is tagged.

15. The method of claim 1, further comprising:
  generating, by the computing device, a topic database for use in annotating input items, the topic database specifying a plurality of topics;
  constructing, by the computing device, a global descriptive context for each topic in the topic database; and
  ranking, by the computing device, each topic in the topic database by comparing the respective descriptive context for each of the topics to the descriptive context for the input item.

16. The method of claim 15, wherein constructing a global descriptive context comprises:
  accessing a plurality of external data sources to retrieve potential topics;
  aggregating the topics into a topic database;
  conducting a topic query in the publicly available search engine for each topic in the topic database;
  constructing the global descriptive context based at least in part on the results of the topic query.

17. The method of claim 15, wherein performing the normalization process includes conducting a topic query for the one or more topics in the topic database using a crowd-sourced information source, and updating the topic database based at least in part on the results of the topic query.

18. A method for improving search and retrieval of input items being published to a computer network, the method comprising:
  while publishing one or more input items to the computer network:
    identifying, by a computing device, one or more external data sources;
    retrieving, by the computing device, topics from the identified one or more external data sources;
    aggregating, by the computing device, the topics into a topic database;
    generalizing, by the computing device, the topic database by performing a normalization process;
    conducting a query, by the computing device in a publicly available search engine, for each topic in the generalized topic database;
    constructing, by the computing device and based at least in part on the results of the query, a topic context database;
    identifying, by the computing device, information about the one or more input items, wherein the information about the input item comprises a title;
    conducting a query, by the computing device in a publicly available search engine, for content in the title for the one or more input items;
    constructing, by the computing device and based at least in part on the results of the query, a respective title context for the one or more input items;
    comparing, by the computing device, the title context and the one or more topics in the topic context database using a text similarity computation model;
    determine, by the computing device and based at least in part on the results of the comparison, one or more topics from the topic context database with which to annotate the one or more input items; and
    after annotating, by the computing device, the one or more input items based on the determined topics, publishing, by the computing device, the one or more items to the computer network.

19. The method of claim 18, wherein performing the normalization process includes conducting a query for the one or more topics in the topic database using a crowd-sourced information source, and updating the topic database based at least in part on the results of the search query.

20. A computing device having a processor configured to:
  while publishing an input item to a computer network:
    generate, by executing a content generation module, based at least in part on information about an input item, a descriptive context of the input item by at least:
      performing a query for the input item by searching an academic database that includes at least one of: books, research papers, or journal articles or searching the Internet using a publicly available search engine; and
      adding, to the descriptive context of the input item, at least one textual item from a response to the query for the input item;
    compare, by executing a comparison module, the descriptive context of the input item to respective descriptive contexts of a plurality of other items previously published to the computer network to determine, using a text similarity model, respective levels of similarity between the descriptive context of the input item and the respective descriptive context of each of the plurality of other items, wherein each of the plurality of other items is already tagged with one or more existing tags that a search engine searches when performing a query on the computer network; and automatically tag, using the content generation module, and based at least in part on the respective levels of similarity between the descriptive context of the input item and the respective descriptive context of each of the plurality of other items, the input item with at least one existing tag from the one or more existing tags that a particular content item from the plurality of content items is tagged; and after automatically tagging the input item with the at least one existing tag, automatically publish the input item to the computer network.

21. The computing device of claim 20, wherein comparing the descriptive context of the input item to the respective descriptive contexts of the plurality of other items to determine the respective levels of similarity between the input item and each of the plurality of other items comprises:

generating, based at least in part on the descriptive context of the input item, a vector representing a semantic makeup of the descriptive context of the input item; and determining respective cosine similarities between the vector representing the semantic makeup of the descriptive context of the input item and each of a plurality of respective vectors representing respective semantic makeups of the respective descriptive contexts of the plurality of other items.

22. The computing device of claim 20 further configured to:

generate a topic database for use in annotating input items, the topic database specifying a plurality of topics;

construct a global context for each topic in the topic database; and rank each topic in the topic database by comparing the respective descriptive context for each of the topics to the descriptive context for the input item.

23. A computer-readable storage medium encoded with instructions that, when executed, cause at least one processor to:

while publishing an input item to a computer network:
generate, based at least in part on information about the input item, a descriptive context of the input item by at least:
performing a query for the input item by searching an academic database that includes at least one of: books, research papers, or journal articles or searching the Internet using a publicly available search engine; and
adding, to the descriptive context of the input item at least one textual item from a response to the query for the input item;
compare the descriptive context of the input item to respective descriptive contexts of a plurality of other items previously published to the computer network to determine, using a text similarity model, respective levels of similarity between the descriptive context of the input item and the respective descriptive context of each of the plurality of other items, wherein each of the plurality of other items is already tagged with one or more existing tags that a search engine searches when performing a query on the computer network; and
tag based at least in part on the respective levels of similarity between the descriptive context of the input item and the respective descriptive context of each of the plurality of other items, the input item with at least one existing tag from the one or more existing tags that a particular content item from the plurality of content items is tagged; and
tagging the input item with the at least one existing tag, publish the input item to the computer network.

* * * * *